(12) United States Patent
Matsui et al.

(10) Patent No.: US 9,161,009 B2
(45) Date of Patent: Oct. 13, 2015

(54) SYSTEM, TERMINAL DEVICE, AND IMAGE CAPTURING METHOD

(71) Applicant: FUJITSU LIMITED, Kawasaki-shi, Kanagawa (JP)

(72) Inventors: Kazuki Matsui, Kawasaki (JP); Kenichi Horio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 134 days.

(21) Appl. No.: 13/949,813

(22) Filed: Jul. 24, 2013

(65) Prior Publication Data

US 2014/0086550 A1  Mar. 27, 2014

(30) Foreign Application Priority Data

Sep. 26, 2012  (JP) ................. 2012-213269

(51) Int. Cl.
*H04N 9/80* (2006.01)
*G06F 3/00* (2006.01)
*H04N 9/87* (2006.01)
*H04N 5/76* (2006.01)
*H04N 21/414* (2011.01)
*H04N 21/472* (2011.01)
*H04N 21/6587* (2011.01)
*H04N 5/445* (2011.01)
*H04N 5/765* (2006.01)

(52) U.S. Cl.
CPC . *H04N 9/87* (2013.01); *H04N 5/76* (2013.01); *H04N 21/41407* (2013.01); *H04N 21/47205* (2013.01); *H04N 21/6587* (2013.01); *H04N 5/445* (2013.01); *H04N 5/765* (2013.01)

(58) Field of Classification Search
USPC .................................... 386/239–248
See application file for complete search history.

(56) References Cited

U.S. PATENT DOCUMENTS

2008/0154922 A1*  6/2008 Arai ............................. 707/100
2011/0276653 A1   11/2011 Matsui et al.
2012/0117509 A1*  5/2012 Powell et al. ................. 715/786

FOREIGN PATENT DOCUMENTS

| JP | 2007-034687 | 2/2007 |
| JP | 2009-181460 | 8/2009 |
| JP | 2011-192229 | 9/2011 |
| JP | 2011-238014 | 11/2011 |

* cited by examiner

*Primary Examiner* — Hung Dang
(74) *Attorney, Agent, or Firm* — Staas & Halsey LLP

(57) ABSTRACT

A system includes: an information processing device and a terminal device including a first processor configured to: receive image data including a plurality of first image data that are to be displayed in accordance with a first operation input to the terminal device, store the image data into the first memory, generate, on the basis of a first operation locus corresponding to the first operation and a second operation locus corresponding to a second operation input to the terminal device after the first operation, moving image data that is to be played back in accordance with the second operation, the moving image data including at least a portion of the image data stored in the first memory and corresponding to respective points of the first operation locus, and display the moving image data in the display device.

20 Claims, 16 Drawing Sheets

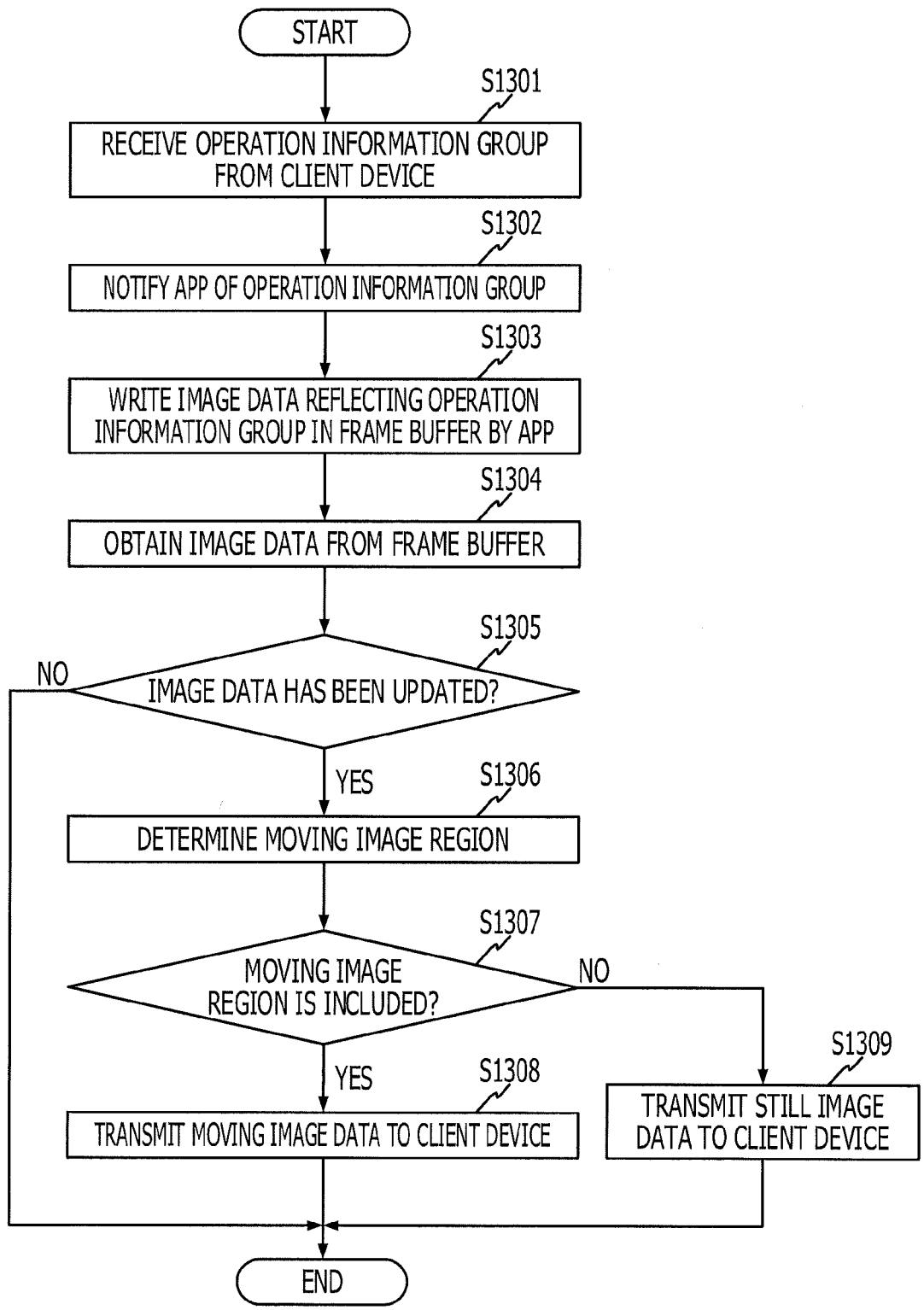

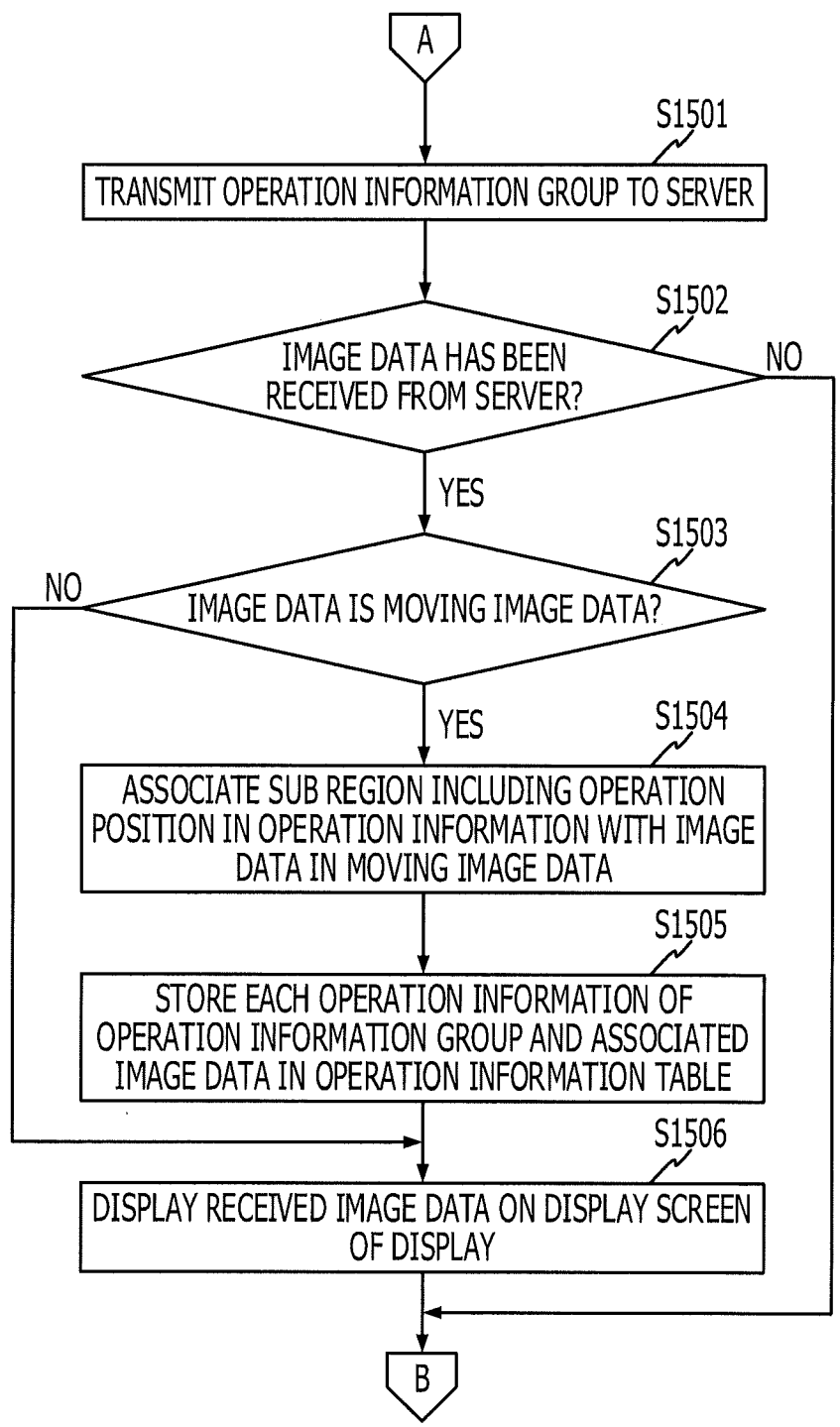

ND IMAGE
SYSTEM, TERMINAL DEVICE, AND IMAGE CAPTURING METHOD

CROSS-REFERENCE TO RELATED APPLICATION

This application is based upon and claims the benefit of priority of the prior Japanese Patent Application No. 2012-213269, filed on Sep. 26, 2012, the entire contents of which are incorporated herein by reference.

FIELD

The embodiment discussed herein is related to a technology in which a terminal device captures an image for display.

BACKGROUND

A thin client system is a system which causes a client to have only a minimum function and an application and manages data in a server. As terminal devices, such as a tablet terminal, a smart phone, and so forth, have been widely used, there are increasing demands for a so-called mobile thin client system that allows in-company applications and data to be used in the mobile environment in a secure manner.

As the related technology, a technology in which a server receives operation information from a terminal device, encodes screen information generated from the received operation information as moving image data, and changes a frame rate of the encoded screen information is described in Japanese Laid-open Patent Publication No. 2011-192229. Also, a technology in which a terminal device holds screen information received from a server and, when it is determined that communication with the server is disconnected, the terminal device reproduces the screen information which has been held to display it on a display of the terminal device is disclosed in Laid-open Patent Publication No. 2007-34687.

SUMMARY

According to an aspect of the invention, a system includes: a terminal device including: a first memory, and a first processor coupled to the first memory and configured to: receive image data including a plurality of first image data corresponding to images that are to be displayed in a display device in accordance with a first operation input to the terminal device, store the image data into the first memory, generate, on the basis of a first operation locus corresponding to the first operation and a second operation locus corresponding to a second operation input to the terminal device after the first operation, moving image data that is to be played back in accordance with the second operation, the moving image data including at least a portion of the image data stored in the first memory and corresponding to respective points of the first operation locus, and display the moving image data in the display device; and an information processing device including: a second memory, and a second processor coupled to the second memory and configured to transmit the image data to the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a flowchart illustrating an example of image processing procedures performed by a server; and FIGS. 14A, 14B, and 14C are flowcharts illustrating an example of procedures of image capturing processing performed by a client device.

DESCRIPTION OF EMBODIMENT

According to the related art, when the thin client system is used using a tablet terminal or the like, the environment of communication with the server tends to be unstable, and there might be cases where screen update following an operation performed by a user is interrupted and thus the user operability is disadvantageously reduced.

According to an aspect of the technology described in this embodiment, a system, a terminal device, and an image capturing method each of which that reduces reduction in user operability may be provided.

The disclosed system, terminal device, and image capturing method will be hereinafter described in detail with reference to the accompanying drawings.

(Example Image Capturing Method)

Figure 1B:
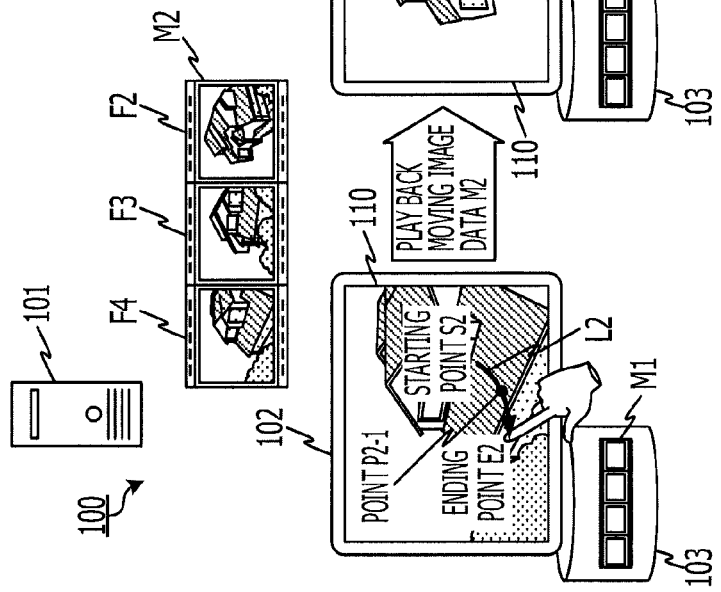
FIGS. 1A and 1B are views illustrating an example image capturing method according to an embodiment.
Figure 1A:
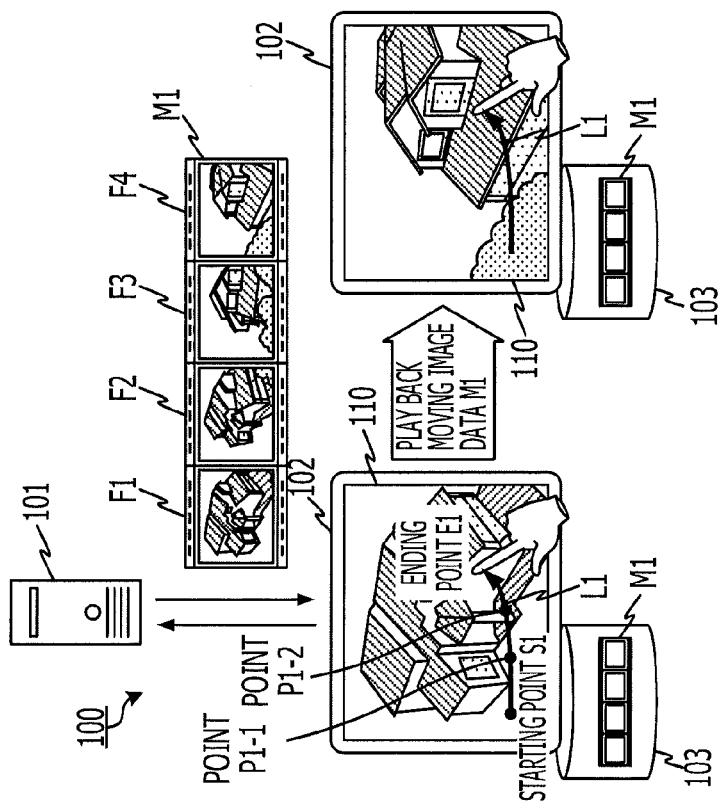

FIGS. 1A and 1B are views illustrating an example image capturing method according to this embodiment. In FIGS. 1A and 1B, a system 100 includes an information processing device 101 and a terminal device 102. The system 100 is, for example, a thin client system which allows the terminal device 102 to only have a minimum function, and executes an application software and manages data in the information processing device 101. The application software will be hereinafter referred to as an "app".

The information processing device 101 is a computer that is communicable with the terminal device 102 via a network. Also, the information processing device 101 has a function of generating image data of an image to be displayed on a display screen 110 of the terminal device 102 and transmitting the image data of the image to the terminal device 102. The information processing device 101 is, for example, a server.

The image is, for example, an image of a screen that displays a result of execution of an app executed in the information processing device 101 in response to a request from the terminal device 102. Examples of the app include, for example, a design support tool software, a presentation software, a spreadsheet software, an electronic mail software, and so forth. The image data is, for example, data representing an image which is an execution result of the app, that is, computer aided design (CAD) data used for drawing, a product catalog data, or the like. The image data may be still image data including a single piece of image data, and also, may be a moving image data including a plurality of pieces of image data.

The terminal device 102 is a computer that is communicable with the information processing device 101 via a network. The terminal device 102 includes the display screen 110 and has a function of transmitting operation information of an operation performed by the user to the information processing device 101 and displaying an image on the display screen 110 on the basis of the image data received from the information processing device 101. Examples of the terminal device 102 include, for example, a tablet terminal, a notebook personal computer (PC), a smart phone, a mobile phone, and so forth. The operation information includes the coordinate position of a point where an operation is performed on the display screen 110 and the type of the operation. Details of the operation information will be described later with reference to FIG. 5.

In this case, when the thin client system is used using the tablet terminal, the notebook PC, or the like, the bandwidth of the network is narrow, and the state of communication with the server tends to be unstable. Accordingly, there might be cases where the user operability in the tablet terminal or the notebook PC is reduced. For example, it might take a long time to transfer data from the server to the tablet terminal, and thus, a response to the operation performed in the tablet terminal might be deteriorated.

As a possible solution for such an inconvenience, the quality of the image may be lowered to reduce the data amount, thereby reducing the transfer time of the image data. However, in the case of dealing with a fine image such as CAD data used in designing and drawing, if the quality is lowered, a problem might be caused in designing and drawing. Thus, it is difficult to adjust the transfer time for the image data by lowering the image quality.

Therefore, the terminal device 102 according to this embodiment is configured to determine whether or not, when a user repeatedly performs a series of operations, an operation locus of a series of current operations overlaps with that of a series of previous operations performed immediately before the current operations and whether or not the current operation locus has continuity with the previous operation locus. If the current operation locus overlaps with the previous operation locus and the current operation locus has continuity with the previous operation locus, the terminal device 102 generates moving image data for the current operations from moving image data displayed when the series of the previous operations were performed. Thus, the terminal device 102 may play back the moving image data for the current operations by reusing image data in the previous moving image data without communicating with the information processing device 101, and thus, the user operability may be improved.

In this case, a series of operations is operations input to the terminal device 102 by the user, and is, for example, if the terminal device 102 includes a touch panel, a drag operation from bringing a finger or the like of the user in contact to the touch panel to removing the finger or the like of the user from the touch panel. When the terminal device 102 includes a mouse, the series of operations is a drag operation from pressing down the button of the mouse to releasing the button of the mouse. Determination regarding whether or not the loci overlap with each other and the loci have continuity will be described later with reference to FIG. 10.

When the terminal device 102 transmits operation information for the series of operations performed by the user to the information processing device 101, the terminal device 102 receives moving image data corresponding to the series of operations from the information processing device 101. The moving image data corresponding to the series of operations is, for example, moving image data that a 3 dimensions (3D) object displayed on a design support tool software rotates.

FIG. 1A is a diagram illustrating an example operation locus of a first series of operations, and FIG. 1B is a diagram illustrating an example operation locus of a second series of operations. In FIGS. 1A and 1B, the information processing device 101 executes a design support tool software, and the terminal device 102 accesses the information processing device 101.

Each time the terminal device 102 obtains operation information of an operation performed by the user, the terminal device 102 transmits the operation information to the information processing device 101. In FIG. 1A, when the terminal device 102 obtains operation information at each of the points from a starting point S1 to an ending point E1, which represent an operation locus L1 of the series of operations performed by the user, the terminal device 102 transmits the operation information at each of the points representing the operation locus L1 to the information processing device 101. The information processing device 101 generates moving image data M1 on the basis of the received operation information and transmits the moving image data M1 to the terminal device 102. A specific method for generating moving image data will be described later with reference to FIG. 5.

The moving image data M1 includes four pieces of data, that is, image data F1, image data F2, image data F3, and image data F4. The image data F1 is image data displayed on the display screen 110 at the starting point S1, that is, a starting position of a drag operation performed by the user. The image data F2 is image data displayed when the drag operation performed by the user has reached the point P1-1. The image data F3 is image data displayed when the drag operation performed by the user has reached the point P1-2. The image data F4 is image data displayed when the drag operation has reached the ending point E1, that is, an ending position of the drag operation.

The terminal device 102 which has received the moving image data M1 stores the image data F1 to the image data F4 and the coordinate positions of the operation locus L1 in a table 103 of the terminal device 102 such that each of the image data F1 to the image data F4 is associated with the corresponding one of the coordinate positions, and plays back the moving image data M1 on the display screen 110. The user may confirm a result of the operation locus L1 of the series of operations by playing back the moving image data M1. Note that the terminal device 102 may store the coordinate position of each of the points representing the operation locus L1 and corresponding image data in association with each other in the table 103, and also, may store the coordinate positions of some of the points representing the operation locus L1 and corresponding image data in association with each other in the table 103. Some of the points representing the operation locus L1 might be hereinafter referred to as an "operation locus of a continuous operation" performed in the display screen 110.

Next, after the user inputs the operation locus L1, as illustrated in FIG. 1B, the terminal device 102 obtains operation information at each of the points from the starting point S2 to the ending point E2 which represent an operation locus L2 of a series of operations performed by the user. Then, the terminal device 102 determines whether or not the operation locus L2 of the series of operations has continuity with the operation locus L1 of a continuous operation and a part or the whole of the operation locus L2 of the series of operations overlaps with the operation locus L1 of the continuous operation with reference to the table 103.

In the example illustrated in FIG. 1B, it is assumed that the terminal device 102 determines that the operation locus L2 has continuity with the operation locus L1 and the whole of the operation locus L2 overlaps with the operation locus L1. Specifically, it is assumed that the starting point S2 of the operation locus L2 corresponds to the ending point E1 of the operation locus L1, the point P2-1 of the operation locus L2 corresponds to the point P1-2 of the operation locus L1, and the ending point E2 of the operation locus L2 corresponds to the point P1-1 of the operation locus L1. In this case, the terminal device 102 extracts image data corresponding to the coordinate position of each of the points representing the operation locus L2 among the image data F1, the image data F2, and the image data F3, and the image data F4 which are associated with the respective coordinate positions of the points of the operation locus L1. In the example illustrated in FIG. 1B, the terminal device 102 extracts the image data F2 to the image data F4.

After extraction, the terminal device 102 generates moving image data M2 including the image data F4, the image data F3, and the image data F2 in this order and plays back the moving image data M2 on the display screen 110. The user may confirm a result of the operation locus L2 of the series of operations by playing back the moving image data M2. Furthermore, the terminal device 102 may generate the moving image data M2 without affecting the communication environment, and therefore, the operability in displaying the moving image data M2 on the display screen 110 may be increased.

(Example System Configuration of Thin Client System)

Next, a case where the system 100 illustrated in FIG. 1 is applied to a thin client system will be described.

Figure 2:
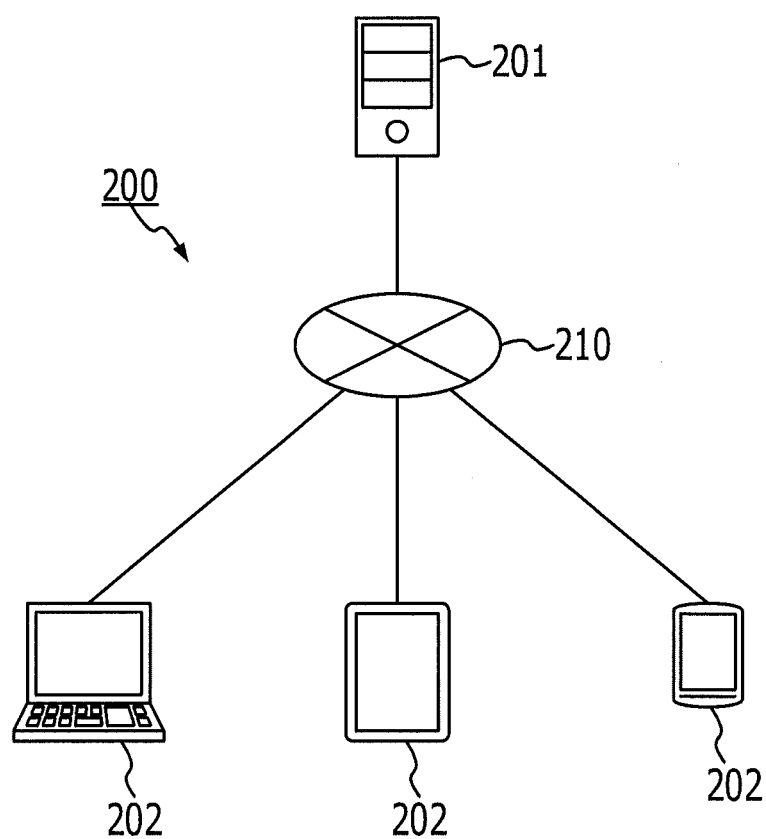
FIG. 2 is a diagram illustrating an example system configuration of a thin client system.

FIG. 2 is a diagram illustrating an example system configuration of a thin client system. In FIG. 2, a thin client system 200 includes a server 201, and a plurality of client devices 202 (3 client devices in the example illustrated in FIG. 2). In the thin client system 200, the server 201 and the client devices 202 are connected with each other via a network 210 so as to communicate with each other. Examples of the network 210 include, for example, a mobile communication network (a mobile phone network), the Internet, and so forth.

The thin client system 200 causes the server 201 to control screens displayed by the client devices 202 by remote control. The thin client system 200 actually causes the client devices 202 to display a result of processing executed by the server 201 and data held by the server 201. Thus, the thin client system 200 may act as if the client devices 202 subjectively executed processing or held data.

The server 201 is a computer that provides a remote screen control service of controlling the screens displayed by the client devices 202 by remote control. The server 201 corresponds to the information processing device 101 illustrated in FIG. 1. The client devices 202 are computers which receive the remote screen control service from the server 201. Each of the client devices 202 corresponds to the terminal device 102 illustrated in FIG. 1.

(Example Hardware Configuration of Server 201)

Figure 3:
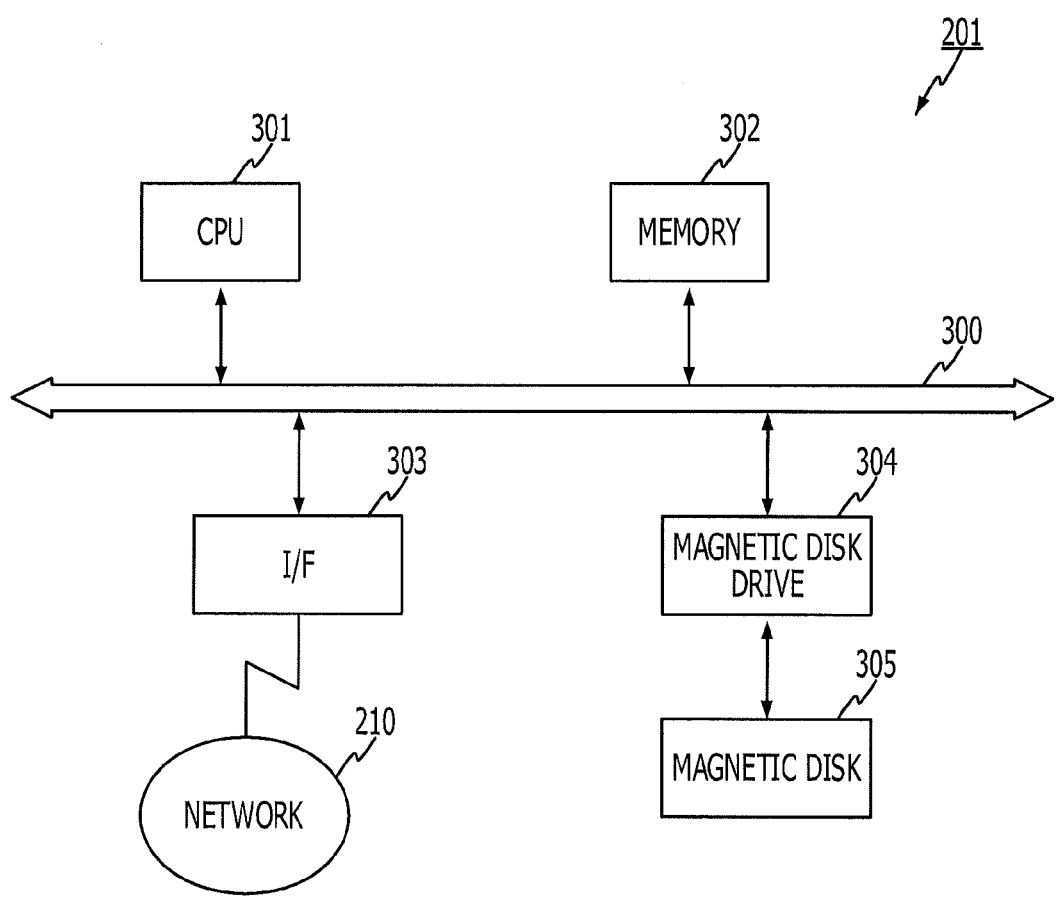
FIG. 3 is a block diagram illustrating an example hardware configuration of a server.

FIG. 3 is a block diagram illustrating an example hardware configuration of a server. In FIG. 3, the server 201 includes a central processing unit (CPU) 301, a memory 302, an interface (I/F) 303, a magnetic disk drive 304, and a magnetic disk 305. The components are connected with one another via a bus 300.

In this case, the CPU 301 controls the entire server 201. The memory 302 includes, for example, a read only memory (ROM), a random access memory (RAM), a flash ROM, and so forth. Specifically, for example, the flash ROM or the ROM stores various programs and the RAM is used as a work area of the CPU 301. A program stored in the memory 302 is loaded in the CPU 301 and thereby causing the CPU 301 to execute coded processing.

The I/F 303 is connected to the network 210 via a communication line and to another computer (for example, the client device 202) via the network 210. The I/F 303 controls the network 210 and an internal interface, and also controls input and output of data from another computer. As the I/F 303, a modem, a LAN adapter or the like may be employed.

The magnetic disk drive 304 controls read and write of data to and from the magnetic disk 305 in accordance with control performed by the CPU 301. The magnetic disk 305 stores data written by control performed by the magnetic disk drive 304. Note that the server 201 may include, in addition to the above-described components, for example, a solid state drive (an SSD), a keyboard, a display, and so forth.

(Example Hardware Configuration of Client Device 202)

Figure 4:
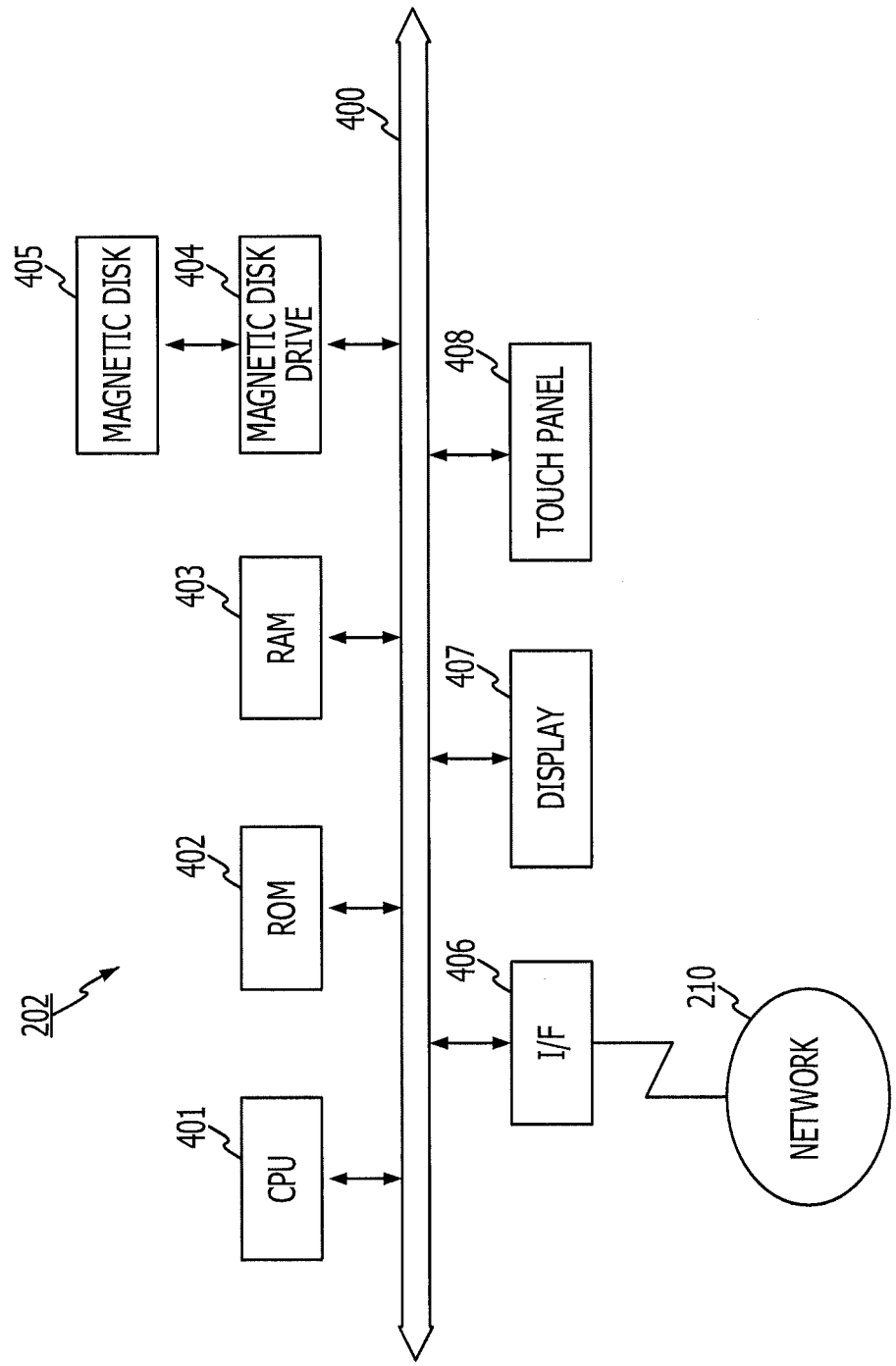
FIG. 4 is a block diagram illustrating an example hardware configuration of a client device.

FIG. 4 is a block diagram illustrating an example hardware configuration of a client device. In FIG. 4, the client device 202 includes a CPU 401, a ROM 402, a RAM 403, a magnetic disk drive 404, a magnetic disk 405, an I/F 406, a display 407, and a touch panel 408. Also, the components are connected with one another via a bus 400.

In this case, the CPU 401 controls the entire client device 202. The ROM 402 stores a program, such as a boot program and so forth. The RAM 403 is used as a work area of the CPU 401. The magnetic disk drive 404 controls read and write of data to and from the magnetic disk 405 in accordance with control performed by the CPU 401. The magnetic disk 405 stores data written by control performed by the magnetic disk drive 404.

The I/F 406 is connected to the network 210 via a communication line and to another computer (for example, the server 201) via the network 210. The I/F 406 controls the network 210 and an internal interface and also controls input and output of data from another computer.

The display 407 displays a cursor, an icon, or a tool box, as well as data, such as a document, an image, function information, and so forth. As the display 407, for example, a thin film transistor (TFT) liquid crystal display may be employed. The display 407 includes, for example, the display screen 110 illustrated in FIG. 1.

The touch panel 408 detects a touch operation or a drag operation performed by the user. Note that the client device 202 illustrated in FIG. 4 is assumed to be a tablet terminal. If the client device 202 is a personal computer, the client device 202 may include a keyboard, a mouse, and so forth.

(Functional Configuration of Server 201)

Figure 5:
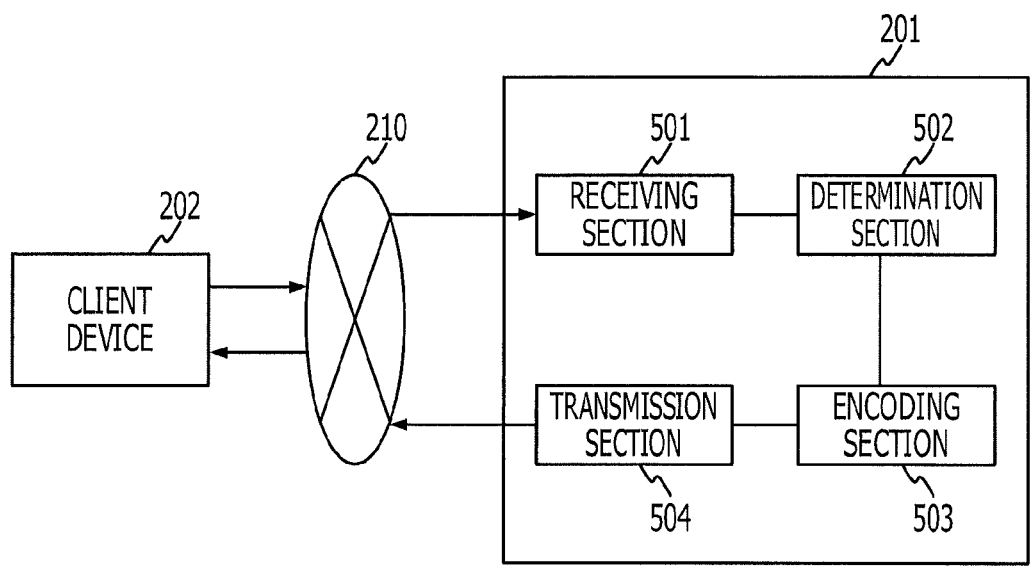
FIG. 5 is a block diagram illustrating an example functional configuration of a server.

Next, the function of the server 201 will be described. FIG. 5 is a block diagram illustrating an example functional configuration of a server. The server 201 includes a receiving section 501, a determination section 502, an encoding section 503, and a transmission section 504. The receiving section 501, the determination section 502, the encoding section 503, and the transmission section 504 that serve as a control section realize the functions of the receiving section 501, the determination section 502, the encoding section 503, and the transmission section 504 by execution of the programs stored in memory devices by the CPU 301. The memory devices are, specifically, for example, the memory 302 and the magnetic disk 305 illustrated in FIG. 3, and so forth.

The receiving section 501 receives operation information from the client device 202. For example, the receiving section 501 receives operation information of an operation performed by the user. The operation information includes the coordinate position of a point at which an operation is performed on the display screen 110, and the type of the operation. The coordinate position of the point at which the operation is performed may be an absolute coordinate from the original point, and also, may be a relative coordinate from the coordinate position of a point at which a previous operation was performed. Examples of the type of the operation include an operation of bringing a finger or the like of the user in contact to the touch panel 408, an operation of keeping the finger or the like of the user in contact with the touch panel 408, and an operation of removing the finger or the like of the user from the touch panel 408. When the client device 202 includes a mouse, examples of the type of the operation include an operation of pressing down a button of the mouse, an operation of keeping the button of the mouse pressed down, an operation of releasing the button of the mouse, and so forth. The received operation information is stored in the memory device, such as the memory 302, the magnetic disk 305, and so forth.

The determination section 502 determines, as a moving image region, a region in which many updates have been performed among difference regions in which image data that is to be display contents of the display screen 110 is updated by the app to which the operation information received by the receiving section 501 is input. Note that the image data is stored in a frame buffer. The frame buffer is a storage region in which image data of one frame that is to be displayed on the display screen 110 is temporarily stored. A specific determination method will be described later with reference to FIG. 9. Note that a determination result is stored in the memory device, such as the memory 302, the magnetic disk 305, and so forth.

The encoding section 503 encodes image data determined by the determination section 502. Specifically, the encoding section 503 encodes the region determined as the moving image region by the determination section 502 in accordance with the format of the moving image data to generate moving image data. Also, the encoding section 503 encodes a region which has not been determined as the moving image region by the determination section 502 in accordance with the format of still image data to generate still image data. The encoded data is stored in the memory device, such as the memory 302, the magnetic disk 305, and so forth. The transmission section 504 transmits the encoded data to the client device 202 via the network 210.

(Functional Configuration of Client Device 202)

Figure 6:
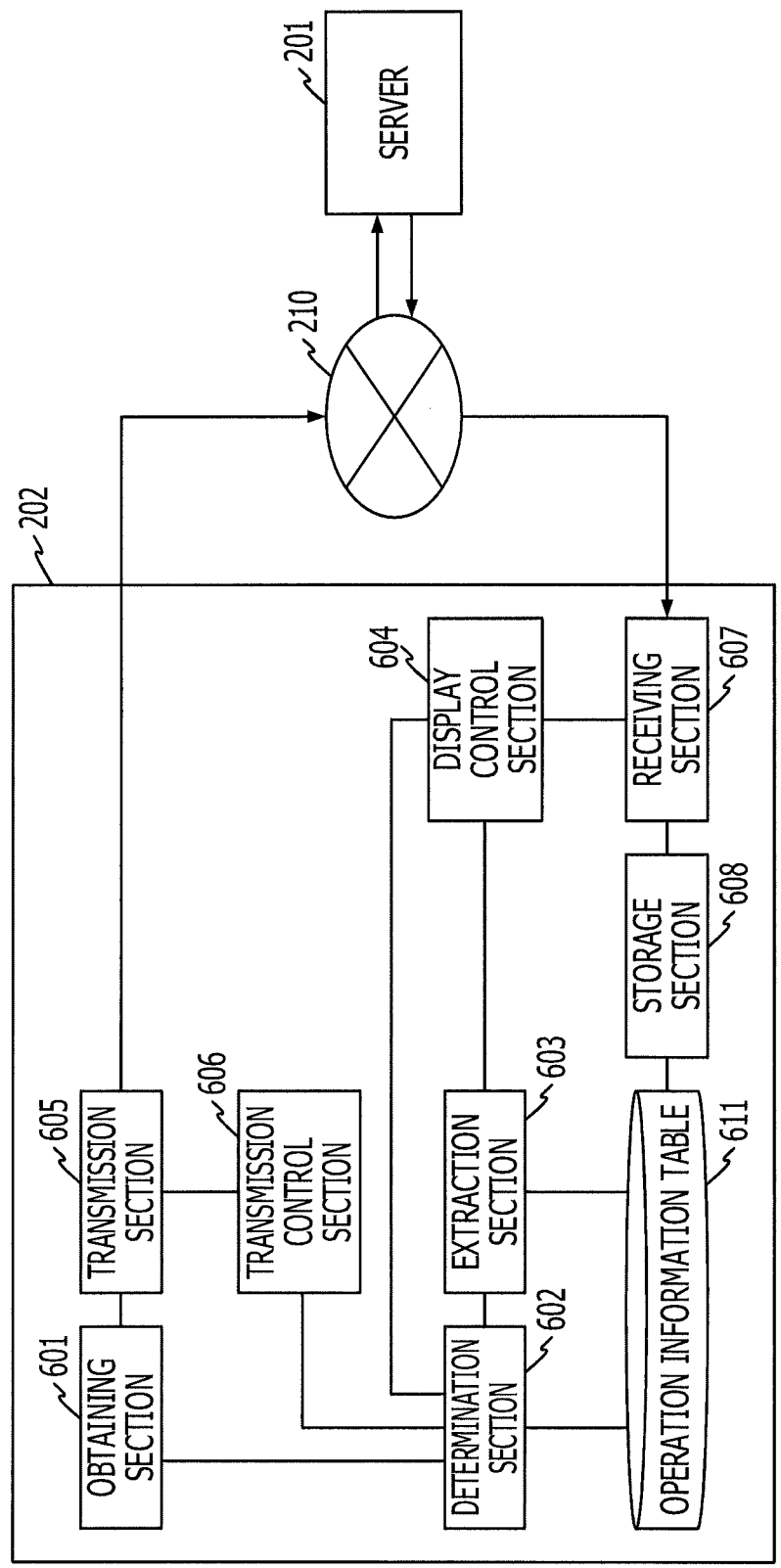
FIG. 6 is a block diagram illustrating an example functional configuration of a client device.

Next, the function of the client device 202 will be described. FIG. 6 is a block diagram illustrating an example functional configuration of a client device. The client device 202 includes an obtaining section 601, a determination section 602, an extraction section 603, a display control section 604, a transmission section 605, a transmission control section 606, a receiving section 607, and a storage section 608. The CPU 401 realizes the functions of the obtaining section 601, the determination section 602, the extraction section 603, the display control section 604, the transmission section 605, the transmission control section 606, the receiving section 607, and the storage section 608 by execution of the programs stored in the memory devices by the CPU 401. The memory devices are specifically, for example, the RAM 403 and the magnetic disk 405 illustrated in FIG. 4, and so forth.

Also, the client device 202 may access an operation information table 611. The operation information table 611 corresponds to the table 103 illustrated in FIG. 1. The operation information table 611 stores the coordinate position of each of the points from a starting point to an ending point, which represent an operation locus of a continuous operation performed on a screen, and image data in association with each other. The operation locus of the continuous operation is a part of the operation locus of a series of operations. Details of the operation information table 611 will be described later with reference to FIG. 7. Also, the operation information table 611 is provided in the storage region, such as the RAM 403, the magnetic disk 405, and so forth.

The obtaining section 601 obtains operation information including the coordinate position of the point at which an operation was performed on the display screen 110. For example, the obtaining section 601 obtains the operation information including the coordinate position of the starting point S2 of the operation locus L2 and the type of operation of bringing the finger or the like of the user in contact with the touch panel 408 at the starting point S2. Note that the obtained operation information is stored in the storage region, such as the RAM 403, the magnetic disk 405, and so forth.

The determination section 602 determines whether or not the operation locus L2 of the series of operations has continuity with the operation locus L1 of the continuous operation and a part or the whole of the operation locus L2 of the series of operations overlaps with the operation locus L1 of the continuous operation with reference to the operation information table 611. In this case, the coordinate position of each of the points from the staring point S1 to the ending point E1, which represent the operation locus L1 of the continuous operation performed on a screen, before the series of operations has been performed on the screen and image data are stored in association with each other in the operation information table 611. A specific determination method will be described later with reference to FIG. 10. Note that a determination result is stored in the storage region, such as the RAM 403, the magnetic disk 405, and so forth.

When the determination section 602 determines a case that will be described below, the extraction section 603 extracts image data corresponding to the coordinate positions of each of the points representing the operation locus L2 of the series of operations among pieces of image data associated with the coordinate positions of the points representing the operation locus L1 of the continuous operation. The case which is determined by the determination section 602 is a case where the operation locus L2 of the series of operations has continuity with the operation locus L1 of the continuous operation and a part or the whole of the operation locus L2 of the series of operations overlaps with the operation locus L1 of the continuous operation. Note that an extraction result is stored in the storage region, such as the RAM 403, the magnetic disk 405, and so forth.

The display control section 604 sequentially displays, in accordance with the order of the series of operations, the pieces of image data corresponding to the coordinate positions of the points representing the operation locus L2 of the series of operations, which have been extracted by the extraction section 603. For example, it is assumed that the extraction section 603 has extracted the coordinate position of the point P1-1 of the operation locus L1, the coordinate position of the point P1-2 of the operation locus L1, and the image data F2, the image data F3, and the image data F4 of the operation locus L1 corresponding to the coordinate position of the ending point E1. As specific examples of corresponding points, it is assumed that the starting point S2 of the operation locus L2 corresponds to the ending point E1 of the operation locus L1, the point P2-1 of the operation locus L2 corresponds to the point P1-2 of the operation locus L1, and the ending point E2 of the operation locus L2 corresponds to the point P1-1 of the operation locus L1. In this case, the display control section 604 displays the image data F4 corresponding to the starting point S2, the image data F3 corresponding to the point P2-1, and the image data F2 corresponding to the ending point E2 on the display screen 110 in this order.

Also, when the determination section 602 determines a case that will be described below, the display control section 604 may sequentially display, in accordance with the order of the series of operations performed on the display screen 110, the image data received as a result of transmission of each of the pieces of operation information of the series of operations to the server 201 on the screen. The case which is determined by the determination section 602 is a case where it is determined that the operation locus L2 of the series of operations does not have continuity with the operation locus L1 of the continuous operation or a case where it is determined that a part or the whole of the operation locus L2 of the series of operations does not overlap with the operation locus L1 of the continuous operation.

The transmission section 605 transmits the operation information obtained by the obtaining section 601 to the server 201. The transmission section 605 may transmit a plurality of pieces of operation information as a whole to the server 201.

When the determination section 602 determines a case that will be described below, the transmission control section 606 stops transmission of the operation information by the transmission section 605. The case which is determined by the determination section 602 is a case where it is determined that the operation locus L2 of the series of operations has continuity with the operation locus L1 of the continuous operation and the whole of the operation locus L2 of the series of operations overlaps with the operation locus L1 of the continuous operation.

The receiving section 607 receives, as a result of transmission of the operation information to the server 201 by the transmission section 605, the image data displayed on the display screen 110 from the server 201. For example, as a result of transmission of the operation information including the coordinate position of the starting point S1 and the type of the operation performed at the starting point S1 to the server 201, the receiving section 607 receives the image data F1 that is to be displayed on the display screen 110. Note that the received image data is stored in the storage region, such as the RAM 403, the magnetic disk 405, and so forth.

The storage section 608 stores, in the operation information table 611, the coordinate position of a point included in each operation information of the continuous operation performed on the display screen 110 and the image data received as a result of transmission of each operation information to the server 201 such that the coordinate position is associated with the image data. For example, the storage section 608 stores the coordinate position of the starting point S1 and the image data F1 in association with each other in the operation information table 611.

Figure 7:
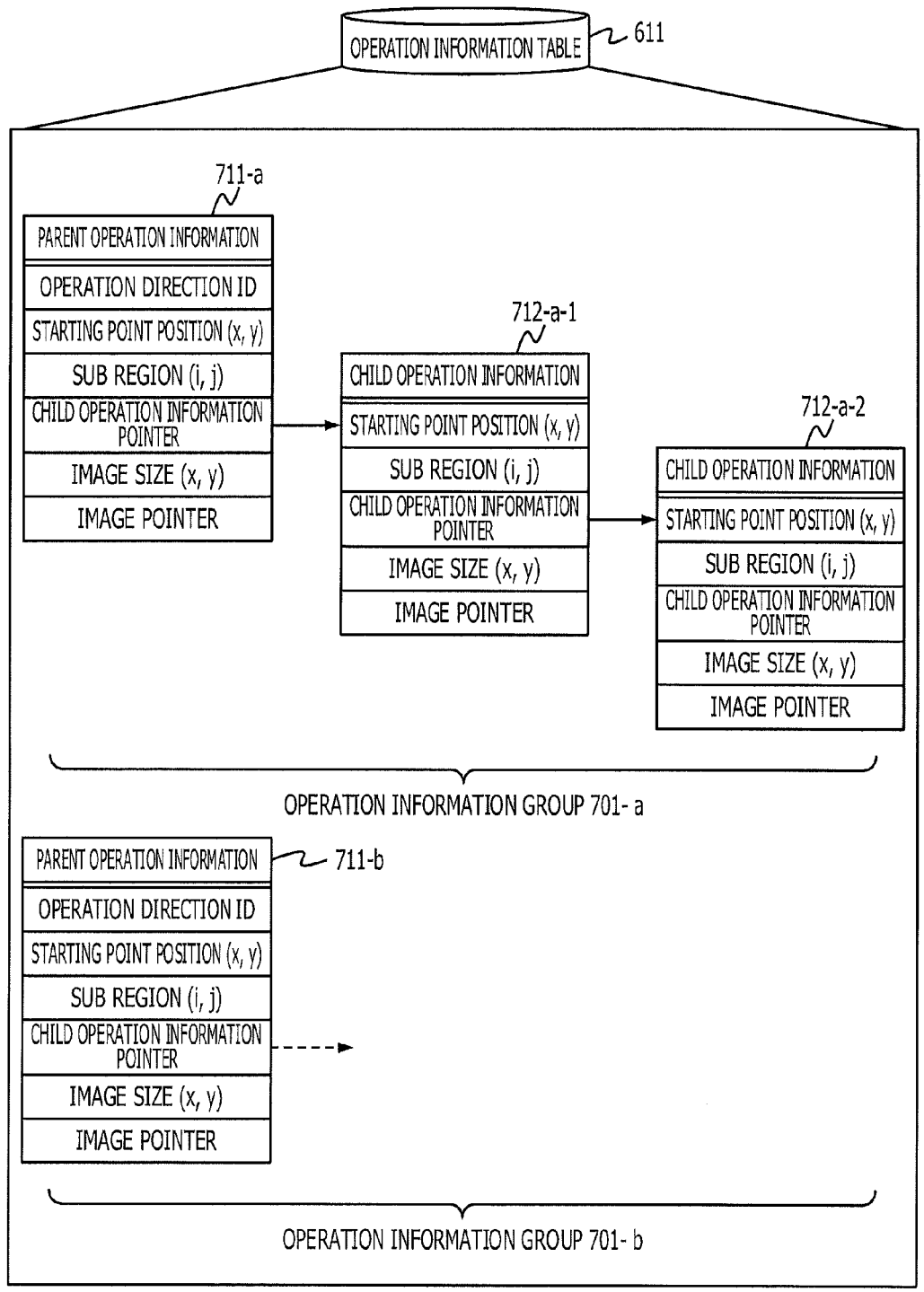
FIG. 7 is a diagram illustrating an example configuration of an operation information table.

FIG. 7 is a diagram illustrating an example configuration of an operation information table. The operation information table 611 includes an operation information group 701. The operation information table 611 illustrated in FIG. 7 includes an operation information group 701-a and an operation information group 701-b. The operation information group 701 includes a single piece of operation information including a starting point and a single piece of operation information including an ending point. The operation information has the position information of a single point on an operation locus.

There are two types of the operation information, that is, parent operation information 711 including a starting point and a child operation information 712 including a point other than the starting point. In FIG. 7, the operation information group 701-a includes parent operation information 711-a, child operation information 712-a-1 associated with the parent operation information 711-a, child operation information 712-a-2 associated with the child operation information 712-a-1, and . . . . An operation information group 701-b includes parent operation information 711-b, and . . . .

Specifically, the parent operation information 711 includes six fields, that is, operation direction ID, starting position, sub region, child operation information pointer, image size, and image pointer fields. In the operation direction ID field, the moving direction of the operation position of an operation via the touch panel or the cursor is stored. For example, when the operation direction is from left to right, an identifier "1" is stored in the operation direction ID field. When the operation direction is from right to left, an identifier "2" is stored in the operation direction ID field. Similarly, when the operation direction is from the top to the bottom, an identifier "3" is stored in the operation direction ID field. Also, similarly, when the operation direction is from the bottom to the top, an identifier "4" is stored in the operation direction ID field.

In the starting point position field, the position information of a starting point of an operation locus is stored. In the sub region field, the coordinate information of a sub region including the position information of the corresponding operation information is stored. The sub region is a region used for determining that two pieces of position information correspond to each other, and specifically, is a region into which the display 407 of the client device 202 is divided by a predetermined pixel number. The predetermined pixel number is a value set by a developer of the thin client system 200, and is, for example, 16 (pixels). The coordinates of the display 407 will be hereinafter represented by (x, y), and the coordinates of the sub region will be hereinafter represented by (i, j).

In the child operation information pointer field, a pointer to the next child operation information is stored. Specifically, in the operation information pointer field, the value of an address to the operation information of the next point among the series of operations is stored. In the image size field, the size of image data associated with the corresponding operation information is stored. In the image pointer field, a pointer to the image data associated with the corresponding operation information is stored. When the image data is moving image data, a pointer to the image data associated with the corresponding operation information may be stored in the image pointer field. A pointer to the moving image data and a frame number to the image data in the moving data associated with the corresponding operation information may be stored in the image pointer field.

The child operation information 712 includes five fields, that is, operation position, sub region, child operation information pointer, image size, and image pointer fields. In each of the sub region, child operation information pointer, image size, and image pointer fields, the same information as that stored in a corresponding one of the fields of the parent operation information 711, and therefore, the description thereof will be omitted. In the operation position field, the position information of a point of an operation locus is stored.

For the type of the operation included in the operation information, the type of the operation included in the parent operation information 711 is indicated by the staring position field and the child operation information pointer field, and the type of the operation included in the child operation information 712 is indicated by the child operation information pointer field. For example, the type of operation of bringing the finger or the like of the user in contact with the touch panel 408 represents a starting point of an operation locus, and is indicated by the parent operation information 711 including the starting point position field.

The type of operation of keeping the finger or the like of the user in contact with the touch panel 408 is indicated by the value of the address of the child operation information 712 being stored in the child operation information pointer field. The operation information may be transmitted to the server 201 in the middle of a drag operation in which the finger or the like of the user is continuously in contact with the touch panel 408, and there might be cases where there is no next child operation information 712 at the time of transmission. In this case, if identification information indicating, for example, that "drag operation is being performed" is stored in the child operation information pointer field, the server 201 may determines, when detecting the identification information indicating that "drag operation is being performed", that a drag operation is being performed.

The type of operation of removing the finger or the like of the user from the touch panel 408 may represent an ending point of an operation locus, and may be indicated, for example, by the parent operation information 711 and the child operation information 712 each having a field in which an identifier indicating whether or not the point is an ending point of an operation locus is stored. As another option, the type of operation of removing the finger or the like of the user from the touch panel 408 may be indicated by "NULL", indicating that no data is included in the child operation information pointer field, being stored. Next, contents stored in the operation information table 611 will be described with reference to FIG. 8.

Figure 8:
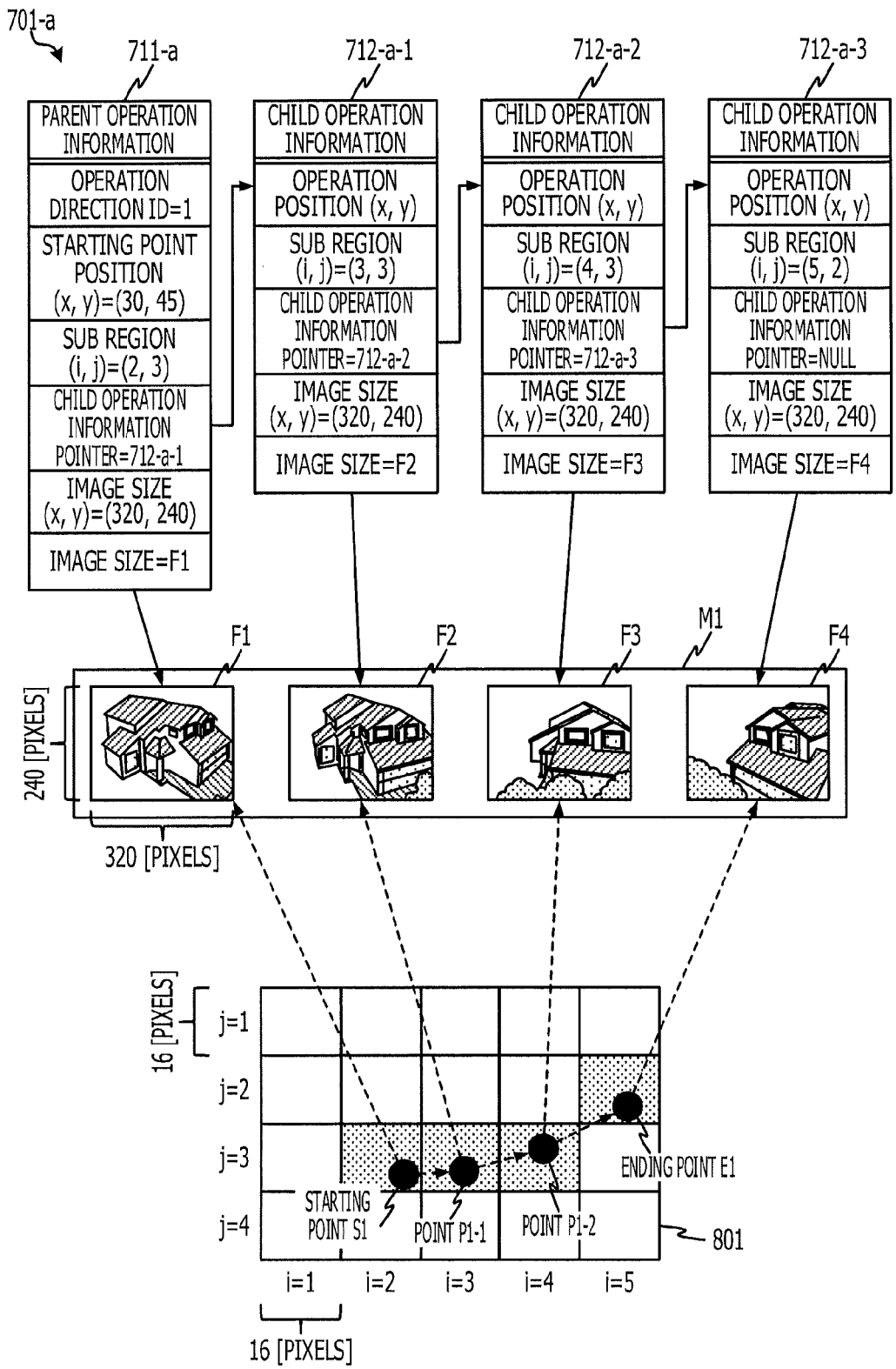
FIG. 8 is a diagram illustrating example contents stored in an operation information table.

FIG. 8 is a diagram illustrating example contents stored in an operation information table. FIG. 8 illustrates the operation information group 701-*a* in the operation locus of the series of operation included in the operation information table 611. The client device 202 define sub region groups 801 into which the display screen 110 of the display 407 is divided by every 16 pixels with the point P (0, 0) on the top left serving as a base point. Note that there might be cases where, in FIG. 8, a code given to data is used as an address at which the data is stored for the sake of simplification.

The operation information group 701-*a* represents information for the operation locus from the starting point S1 to the ending point E1 via the point P1-1 and the point P1-2. The parent operation information 711-*a* included in the operation information group 701-*a* and serving as information for the starting point S1 will be hereinafter described. Since the operation locus from the starting point S1 to the ending point E1 extends from left to right, the identifier "1" is stored in the operation direction ID field. In the starting point position field (x, y), (30, 45) are stored. In the sub region field (i, j), a sub region (2, 3) including the starting point S1 is stored. In the child operation information pointer field, "712-*a*-1" that is to be a pointer for the next child information 712 is stored.

In the image size field, as the size of the image data F1 associated with the starting point S1, (320, 240) are stored. In the image pointer field, "F1" that is to be a pointer of the image data F1 of 320 (pixels) in width and 240 (pixels) in height, which has been associated with the starting point S1, is stored.

Similarly, the operation information group 701-*a* includes child operation information 712-*a*-1 that is information for the point P1-1, child operation information 712-*a*-2 that is information for the point P1-2, and child operation information 712-*a*-3 that is information for the ending point E1. The description of the child operation information 712-*a*-1, the child operation information 712-*a*-2, and the child operation information 712-*a*-3 is substantially the same as that of the parent operation information 711-*a*, and therefore, the description will be omitted. In the child operation information pointer field of the child operation information 712-*a*-3, "NULL" is stored, and therefore, it is indicated that the child operation information 712-*a*-3 is information for the ending point of the operation locus.

The image data F1, the image data F2 associated with the point P1-1, the image data F3 associated with the point P1-2, and the image data F4 associated with the ending point E1 are in the RAM 403 and the magnetic disk 405 of the client device 202. Next, an operation example performed when the thin client system 200 according to this embodiment executes image processing will be described with reference to FIG. 9, FIG. 10, FIG. 11, and FIG. 12.

Figure 9:
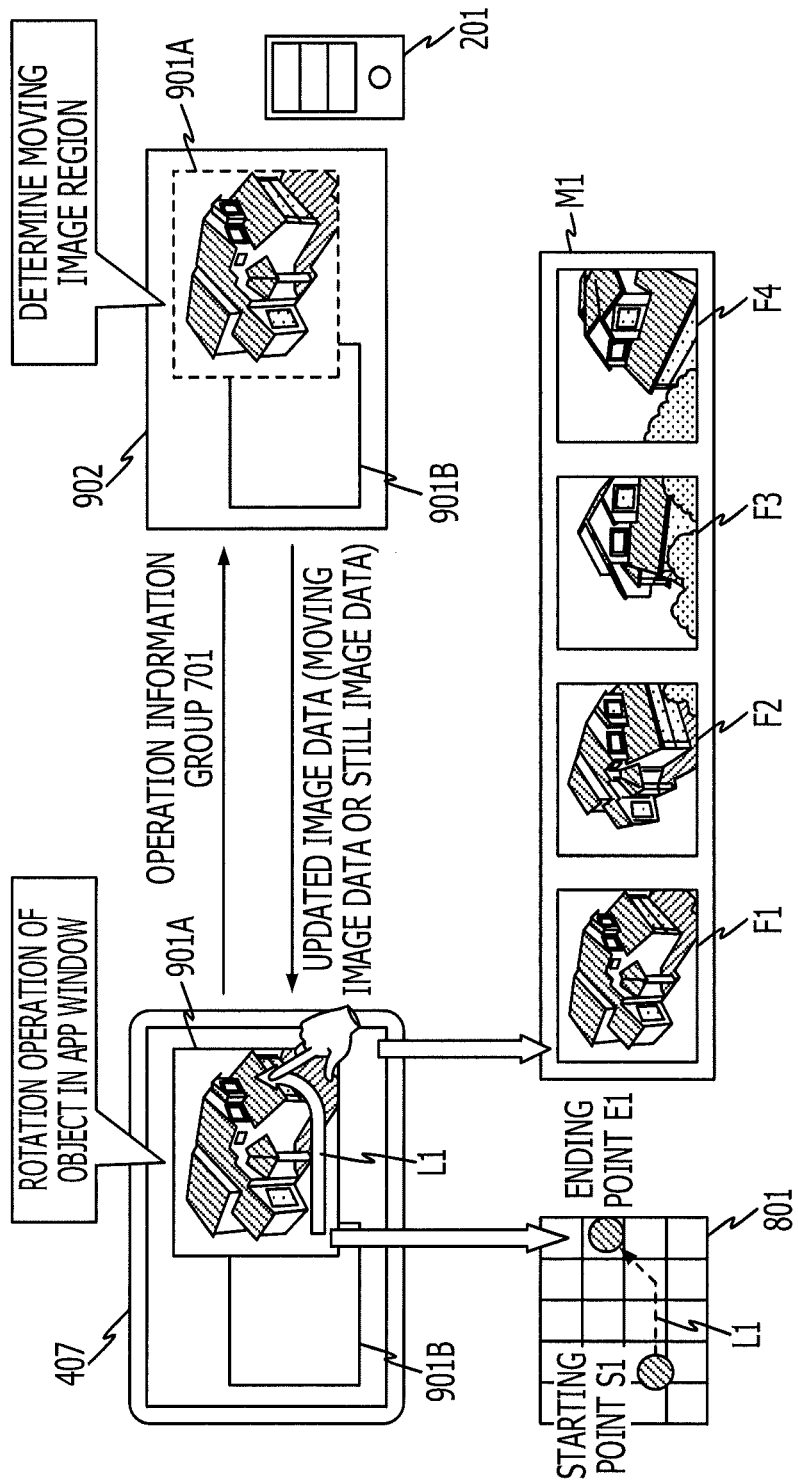
FIG. 9 is a diagram illustrating an operation example of a thin client system performed when storing image data.

FIG. 9 is a diagram illustrating an operation example of a thin client system performed when storing image data. The display 407 of the client device 202 displays a window 901A that displays an execution result of an app A and a window 901B that displays an execution result of an app B. It is assumed that, in this state, an operation by the user is performed in the window 901A. Specifically, it is assumed that the user performs a drag operation of drawing the operation locus L1 to rotate an object in the app A. In this case, the client device 202 transmits the operation information group 701 including the coordinate position of each of the points of the operation locus L1 to the server 201.

The server 201 determines, as a moving image region, a region in which many updates has been performed among pieces of image data in a frame buffer 902 which have been updated on the basis of the operation information group 701, and compresses the determined region into compression format data. The server 201 specifies, as the region in which many updates have been performed, for example, a region in which the number of changes has exceeded a threshold. Next, the server 201 transmits, as updated image data, moving image data or still image data. There is a probability that the updated image data includes both of moving image data and still image data, and there is also a probability that the updated image data includes one of moving image data and still image data. In the example illustrated in FIG. 9, the server 201 determines the region of the window 901A as the moving image region.

When the image data is still image data, as the format of the still image data, a format, such as Joint Photographic Experts Group (JPEG), Graphic Interchange Format (GIF), Portable Network Graphics (PNG), and so forth, may be employed. Also, when an updated image is moving image data, as the format of the moving image data, a format, such as Moving Picture Experts Group (MPEG), and so forth, may be employed.

Note that, for the technology of encoding data of a part in which movement between frames is large into compression format data for a moving image and transmitting the encoded data to the client device 202, for example, Japanese Laid-open Patent Publication No. 2011-238014 may be referred to as a reference literature.

The client device 202 which has received the image data receives the moving image data M1 including the image data F1, the image data F2, the image data F3, and the image data F4. When the client device 202 according to this embodiment receives the moving image data M1, the client device 202 stores the moving image data M1 in the storage device, such as the RAM 403 and the magnetic disk 405, and associates each of the points of the operation locus L1 with the image data in the moving image data. When the client device 202 receives the still image data, the client device 202 does not store the still image data in the storage device. This is because, when the technology provided as a reference literature is employed, an updated region is easily managed since the moving image data is transmitted as a rectangular region. The client device 202 may store the still image data in the storage device and associate each of the points of the operation locus with the still image data.

Next, furthermore, when the client device 202 detects a series of operations, the client device 202 executes processing of determining whether or not a previous series of operations has continuity with the series of operations and the operation locus of the previous series of operations which has been stored overlaps with the operation locus of the detected series of operations. An example of processing of determining whether or not operation loci have continuity with each other and the operation loci overlap with each other will be described with reference to FIG. 10. The "operation locus of the previous series of operations" might be hereinafter referred to as a "previous operation locus". Also, the "operation locus of the detected series of operations" might be referred to as a "current operation locus".

Figure 10:
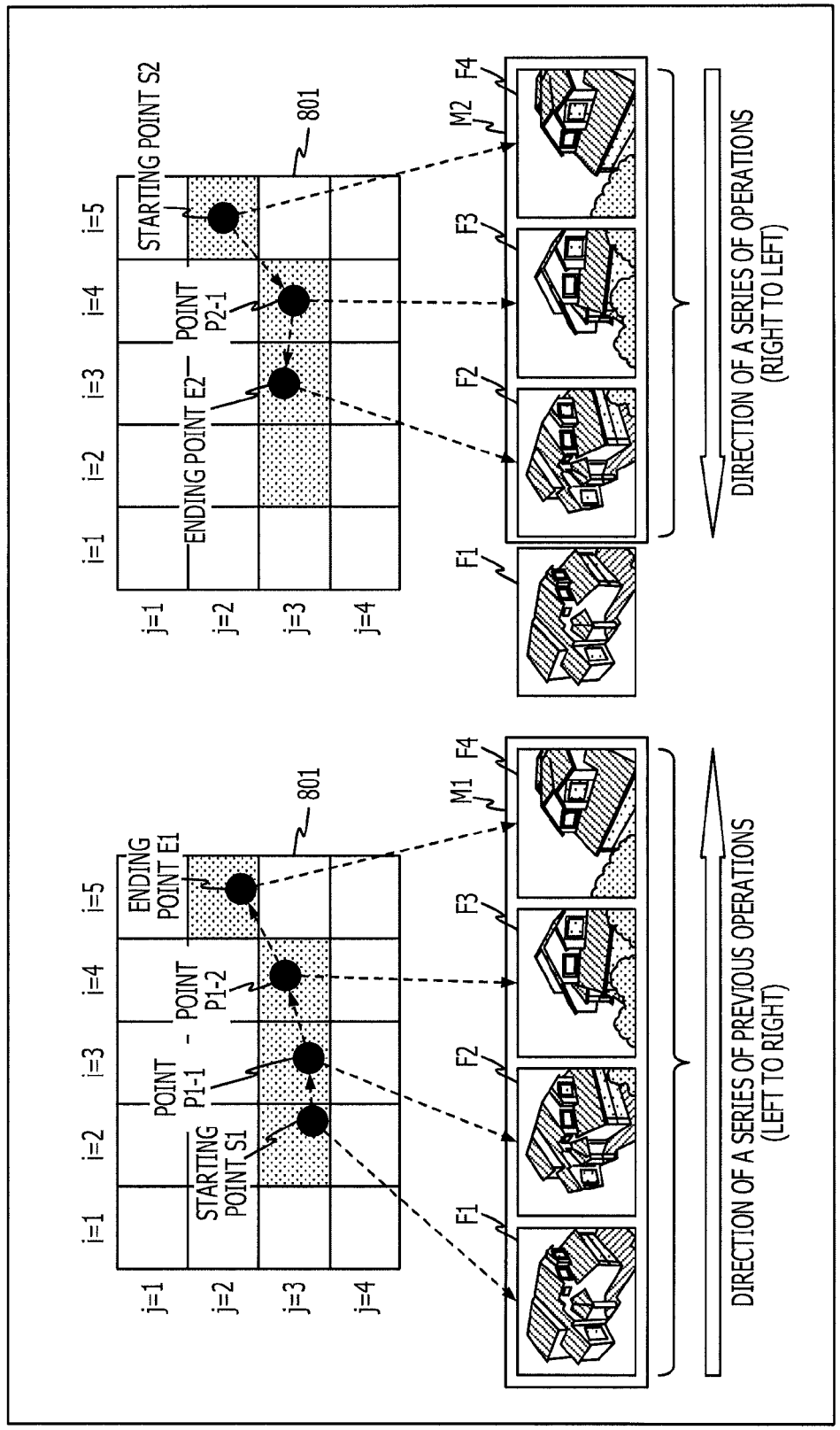
FIG. 10 is a diagram illustrating an example processing of determining whether or not operation loci have continuity with each other and whether operation loci overlap with each other.

FIG. 10 is a diagram illustrating example processing of determining whether or not operation loci have continuity with each other and whether or not operation loci overlap with each other. The client device 202 determines whether or not three conditions are satisfied to determine whether or not operation loci have continuity with each other and whether or not operation loci overlap with each other. As a first condition, the client device 202 determines whether or not the starting point S2 of the current operation locus L2 is included in the sub region including the ending point E1 of the previous operation locus L1. In the example of FIG. 10, the sub regions respectively including the ending point E1 and the starting point S2 are both (i, j)=(5, 2), and thus, the client device 202 determines that the starting point S2 of the current operation locus L2 is included in the sub region including the ending point E1.

Furthermore, as a second condition, the client device 202 determines whether or not the direction of the previous series of operations is the inverse direction to the direction of the series of operation. In the example of FIG. 10, the direction of the previous series of operations extends from left to right and the direction of the series of operations extends from right to left, and thus, the client device 202 determines that the direction of the previous series of operations is the inverse direction to the direction of the series of operations. When the first and second conditions are satisfied, the client device 202 determines that the operation locus of the series of operations has continuity with the previous operation locus.

Subsequently, as a third condition, the client device 202 determines whether or not each point representing the current operation locus L2 is included in the sub region including any one of the points representing the previous operation locus L1. In the example of FIG. 10, the starting point S2 is included in the sub region (5, 2) including the ending point E1, the point P2-1 is included in the sub region (4, 3) including the point P1-2, and the ending point E2 is included in the sub region (3, 3) including the point P1-1. Accordingly, the client device 202 determines that each point representing the current operation locus L2 is included in the sub region including any one of the points representing the previous operation locus L1. When the third condition is satisfied, the client device 202 determines that the current operation locus and the previous operation locus overlap with each other.

When the three conditions are satisfied, the client device 202 determines that the operation loci have continuity with each other and the operation loci overlap with each other. In this case, the client device 202 extracts the image data corresponding to each point representing the current operation locus L2 among the pieces of image data in the moving image data M1 associated with the points of the previous operation locus L1, and generates moving image data M2. Next, an operation performed by the thin client system 200 when the three conditions are satisfied will be described with reference to FIG. 11. Furthermore, an operation performed by the thin client system 200 when one of the three conditions is not satisfied will be described with reference to FIG. 12.

Figure 11:
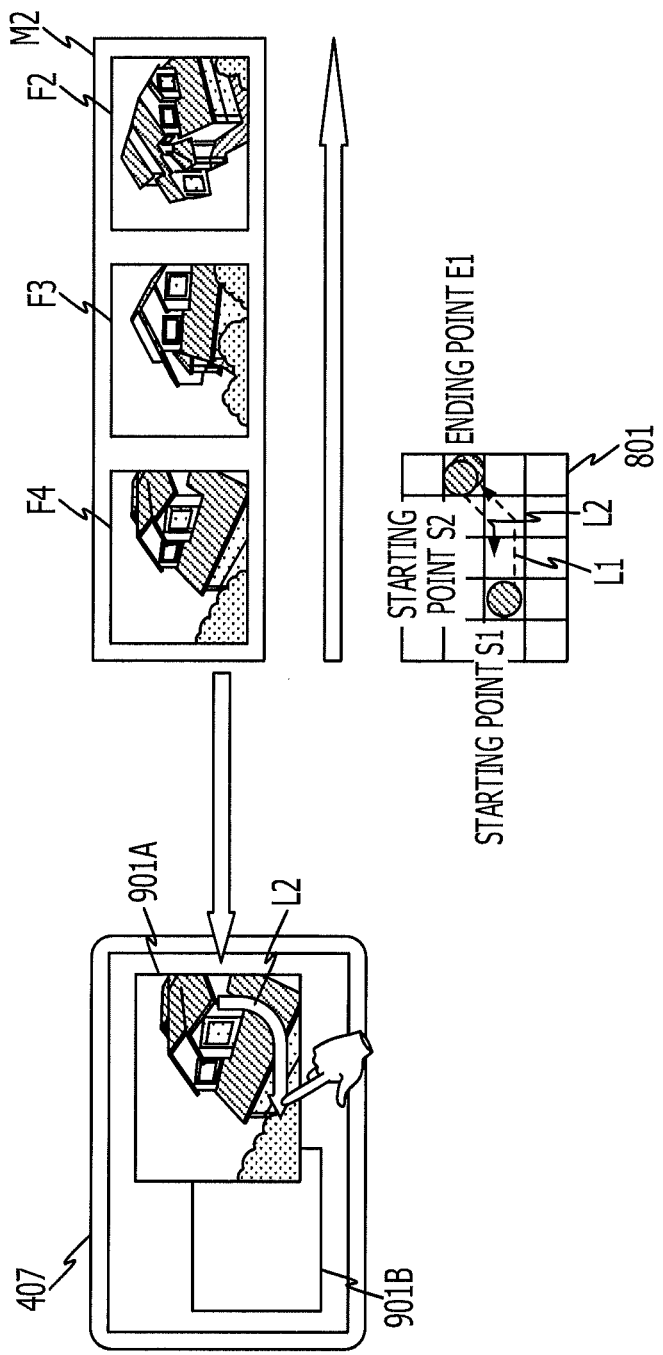
FIG. 11 is a diagram illustrating an operation example of the thin client system performed when it is determined that operation loci have continuity with each other and operation loci overlap with each other.

FIG. 11 is a diagram illustrating an operation example of a thin client system performed when it is determined that operation loci have continuity with each other and operation loci overlap with each other. When the client device 202 determines that the operation loci have continuity with each other and operation loci overlap with each other, the client device 202 extracts that image data corresponding to each point representing the current operation locus L2 among the pieces of image data corresponding to the points of the previous operation locus L1. In the example of FIG. 11, the client device 202 extracts the image data F2, the image data F3, and the image data F4 among the image data F1, the image data F2, the image data F3, and the image data F4. Subsequently, the client device 202 generates moving image data M2 from the image data F2, the image data F3, and the image data F4 in the order reverse to the playback order of the moving image data M1, and plays back the moving image data M2 in the window 901A of the display 407. Specifically, the client device 202 displays the image data F4, the image data F3, and the image data F2 in the window 901A in this order.

Figure 12:
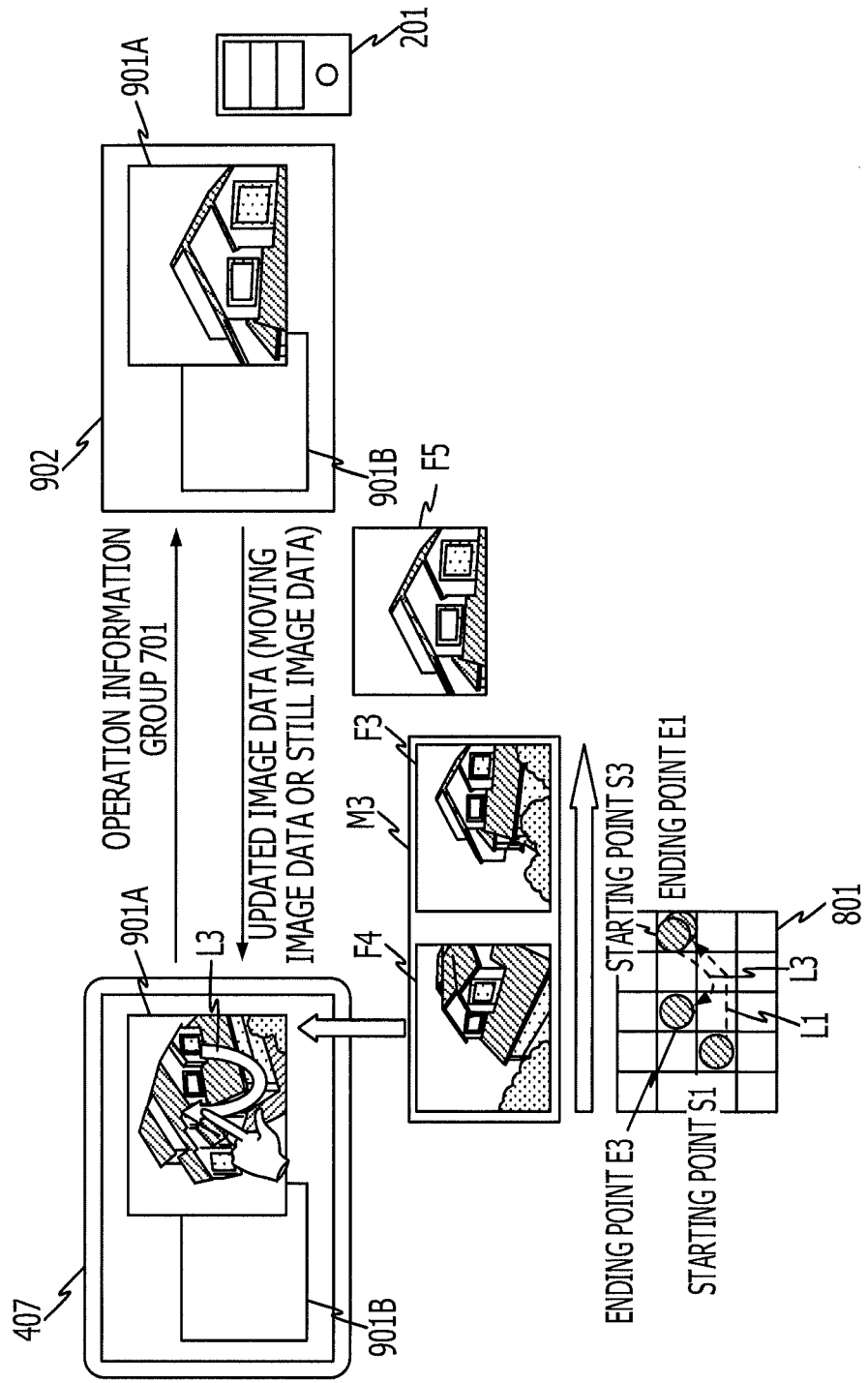
FIG. 12 is a diagram illustrating an operation example of the thin client system performed when it is determined that operation loci do not have continuity with each other or that operation loci do not overlap with each other.

FIG. 12 is a diagram illustrating an operation example of a thin client system performed when it is determined that operation loci do not have continuity with each other or that operation loci do not overlap with each other. When the client device 202 determines that operation loci do not have continuity with each other or operation loci do not overlap with each other, the client device 202 transmits the operation information group 701 to the server 201, receives updated image data from the server 201, and displays the image data in the display 407.

Also, the client device 202 may extract, among the pieces of image data corresponding to the points of the previous operation locus L1, image data corresponding to a point of a current operation locus L3 starting from a starting point S3, which is not out of the operation locus L1.

In the example of FIG. 12, the client device 202 extracts the image data F3 and the image data F4 from the image data F1, the image data F2, the image data F3, and the image data F4, generates moving image data M3, and displays the image data F4 and the image data F3 in the moving image data M3 in this order. Also, the client device 202 obtains image data corresponding to an ending point E3, among the points of the operation locus L3, which is out of the operation locus L1, and thus, transmits the operation information group 701 including operation information that includes the position information of the ending point E3 to the server 201. The server 201 transmits the image data F5 corresponding to the position information of the ending point E3 to the client device 202. The client device 202 displays the image data F5 after displaying the image data F3.

Next, a flowchart of each of the operations illustrated in FIG. 9, FIG. 10, FIG. 11, and FIG. 12 will be described with reference to FIG. 13, FIG. 14A, FIG. 14B, and FIG. 14C. In FIG. 13, a flowchart of image processing performed by the server 201 will be described, and in each of FIG. 14A, FIG. 14B, and FIG. 14C, a flowchart of image processing performed by the client device 202 is illustrated.

FIG. 13 is a flowchart illustrating an example of image processing procedures performed by a server. The image processing performed by the server is processing of updating image data which is to be transmitted to the client device 202 and transmitting the updated image data to the client device 202 on the basis of the operation information group 701 from the client device 202. The server 201 receives the operation information group 701 from the client device 202 (Step S1301). The operation information group 701 may be a single piece of operation information, and also, may be a plurality of pieces of operation information.

Next, the server 201 notifies the app of the operation information group 701 (Step S1302). Subsequently, the server 201 writes the image data reflecting the operation information group 701 to the frame buffer 902 by the app which has received the operation information group 701 (Step S1303). Subsequently, the server 201 obtains the image data from the frame buffer 902 (Step S1304). Note that, when the server 201 receives the operation information group 701 including a plurality of pieces of operation information, the server 201 may obtain image data of each of the pieces of operation information of the operation information group 701, and also, may obtain image data after the app has been notified of all pieces of operation information of the operation information group 701.

Next, the server 201 determines whether or not the image data has been updated (Step S1305). As a procedure of determining whether or not the image data has been updated, for example, the server 201 holds the previous image data and compares the previous image data with the image data obtained by the processing of the Step S1304, thereby determining whether not the image data has been updated. Also, when a plurality of pieces of image data have been obtained by the processing of Step S1304, the server 201 may determine whether or not the image data has been updated among the plurality of pieces of image data.

When the image data has been updated (YES in Step S1305), the server 201 determines the moving image region (Step S1306). A method for determining the moving image region is determined in accordance with the above-described reference literature. Next, the server 201 determines whether or not the moving image region is included (Step S1307). If the moving image region is included (YES in Step S1307), the server 201 transmits moving image data obtained by encoding the obtained image data in accordance with the moving image format to the client device 202 (Step S1308).

When the image data is encoded into MPEG format data as moving image data that is to be transmitted, the server 201 may encode the image data as an I (intra-coded) picture to which inter-frame prediction is not performed, and also, may encode image data as a P (predictive coded) picture to which inter-frame prediction is performed using the previous image data. Also, when a plurality of pieces of image data has been obtained by the processing of Step S1304, the server 201 may encode each of the pieces of image data as an I picture, a P picture, or a B (bidirectionally predictive coded) picture to which inter-frame prediction is performed using the previous image data and the next image data.

When the moving image region is not included (NO in Step S1307), the server 201 transmits still image data obtained by encoding the obtained image data in accordance with the still image format to the client device 202 (Step S1309).

After the processing of Step S1308 is performed, after Step S1309 is ended, or when the image data has not been updated (NO in Step S1305), the server 201 ends image processing performed by the server. By executing image processing by the server, the thin client system 200 is allowed to transmit the image data which has been updated using an appropriate image format in accordance with the update contents of the image data.

Figure 14A:
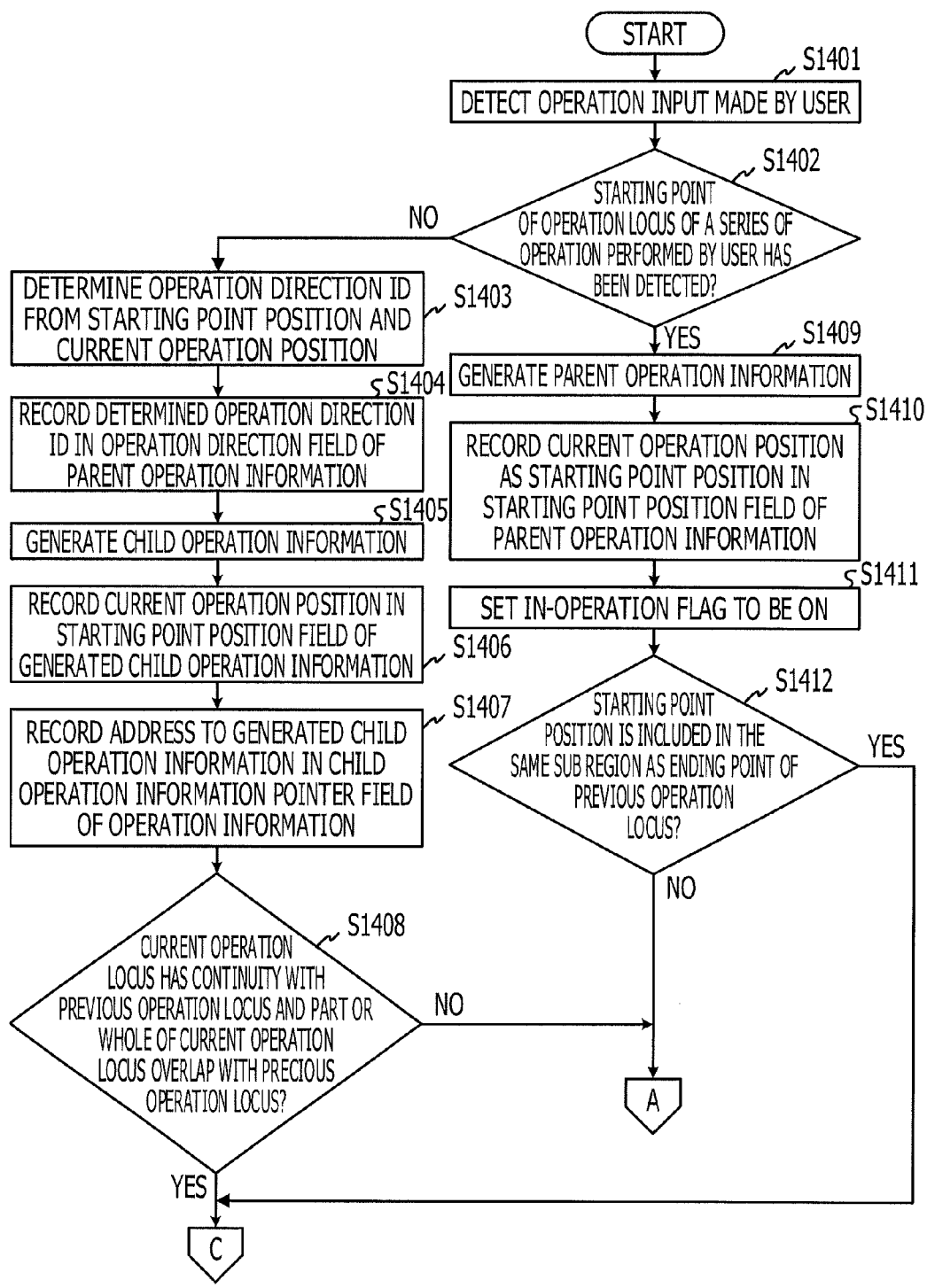
Figure 14C:
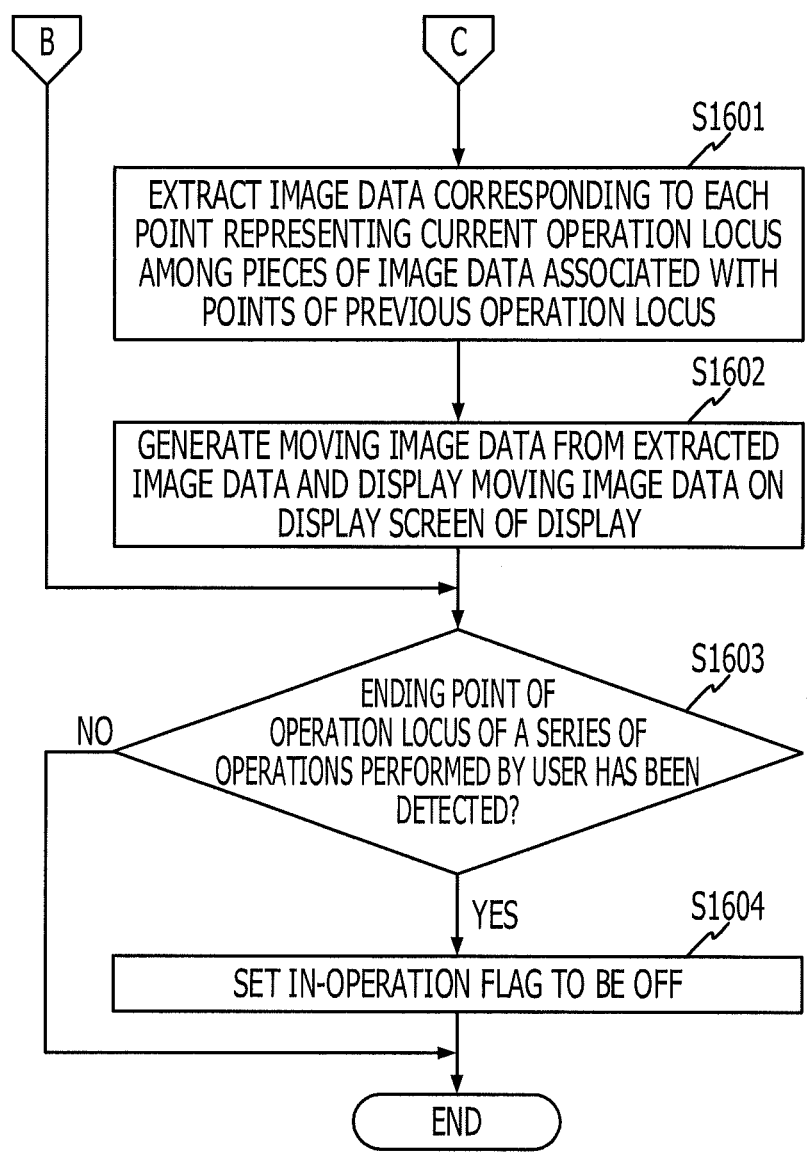

FIGS. 14A, 14B, and 14C are flowcharts illustrating an example of procedures of image capturing processing performed by a client device. Image capturing processing performed by the client device is processing of detecting an operation input made by a user, obtaining image data, and displaying the obtained image data. The client device 202 detects an operation input made by the user (Step S1401). Next, the client device 202 determines whether or not the starting point of an operation locus of a series of operations performed by the user is detected (Step S1402).

As a procedure of detecting the starting point of the operation locus of the series of operations, the client device 202 determines, for example, if a notification that a finger or the like of the user touched the touch panel 408 is detected while an in-operation flag is OFF, that the starting point of the operation locus of the series of operations is detected. Also, when the client device 202 includes a mouse, the client device 202 determines, if a notification that the button of the mouse was pressed down is detected while the in-operation flag is OFF, that the starting point of the operation locus of the series of operations is detected.

If the starting point of the operation locus of the series of operations performed by the user has not been detected (NO in Step S1402), the client device 202 determines the operation direction ID from the starting position and the current operation position (Step S1403). If NO in Step S1402, it is indicated that the client device 202 has detected a point, among the points representing the operation locus, other than the starting point.

Next, the client device 202 records, in the operation direction field of the parent operation information 711, the determined operation direction ID (Step S1404). Subsequently, the client device 202 generates the child operation information 712 (Step S1405). Next, the client device 202 records the current operation position in the starting position field of the generated child operation information 712 (Step S1406). Subsequently, the client device 202 records, in the child operation information pointer field of the operation information, an address to the generated child operation information 712 (Step S1407).

Next, the client device 202 determines whether or not the current operation locus has continuity with the previous operation locus and a part or the whole of the current operation locus overlaps with the previous operation locus (Step S1408). If the current operation locus does not have continuity with the previous operation locus, or if the current operation locus does not overlap with the previous operation locus (NO in Step S1408), the processing of the client device 202 shifts to the processing of S1501 illustrated in FIG. 14B. If the current operation locus has continuity with the previous operation locus and a part or the whole of the current operation locus overlaps with the previous operation locus (YES in Step S1408), the processing of the client device 202 shifts to the processing of Step S1601 illustrated in FIG. 14C.

If the starting point of the operation locus of the series of operations performed by the user is detected (YES in Step S1402), the client device 202 generates the parent operation information 711 (Step S1409). Next, the client device 202 records, as the starting position, the current operation position in the starting position field of the parent operation information 711 (Step S1410). Subsequently, the client device 202 sets the in-operation flag to be ON (Step S1411).

Next, the client device 202 determines whether or not the starting position is included in the same sub region as that in which the ending point of the previous operation locus is included (Step S1412). If the starting position is included in the same sub region as that in which the ending point of the previous operation locus is included (YES in Step S1412), the processing of the client device 202 shifts to the processing of S1601 illustrated in FIG. 14C. Also, if the starting position is not included in the same sub region as that in which the previous operation locus is included (NO in Step S1412), the processing of the client device 202 shifts to the processing of Step S1501 illustrated in FIG. 14B.

If NO in Step S1408, or if NO in Step S1412, the client device 202 transmits the operation information group 701 to the server 201 (Step S1501). Next, the client device 202 determines whether or not image data is received from the server 201 (Step S1502). If the image data is received from the server 201 (YES in Step S1502), the client device 202 determines whether or not the image data is moving image data (Step S1503).

If the image data is moving image data (YES in Step S1503), the client device 202 associates the sub region including the operation position in the operation information with image data in the moving image data (Step S1504). For example, it is assumed that, in the processing of Step S1501, the operation information included in the operation information group 701 is the parent operation information 711-*a*, the child operation information 712-*a*-1, the child operation information 712-*a*-2, and the child operation information 712-*a*-3 illustrated in FIG. 8. Furthermore, it is assumed that the received moving image data includes four pieces of image data.

In this case, in the processing of Step S1504, the client device 202 associates first image data with the parent operation information 711-*a*. Subsequently, the client device 202 associates second image data with the child operation information 712-*a*-1, third image data with the child operation information 712-*a*-2, and fourth image data with the child operation with the child operation information 712-*a*-3. Also, as specific associating processing, the client device 202 stores, for example, the address of each piece of image data in the child operation information field of the corresponding parent operation information 711 and the child operation information field of the corresponding child operation information 712.

Subsequently, the client device 202 stores the image data associated with each piece of operation information of the operation information group 701 in the operation information table 611 (Step S1505). After Step S1505 is ended, or if the image data is still image data (NO in Step S1503), the client device 202 displays the received image data on the display screen 110 of the display 407 (Step S1506). After Step S1506 is ended, or if the image data is not received from the server 201 (NO in Step S1502), the processing of the client device 202 shifts to the processing of Step S1603 illustrated in FIG. 14C.

If YES in Step S1408, or if YES in Step S1412, the client device 202 extracts image data corresponding to each point representing the current operation locus among the pieces of image data associated with the points representing the previous operation locus (Step S1601).

Note that the case where Step S1601 is executed indicates that image data stored in the operation information table 611 of the client device 202 is reused. In this case, the client device 202 may transmit identification information that "local display is being performed" indicating that image data stored in the client device 202 is displayed to the server 201, and transmit the operation information group 701. Furthermore, when there is no longer image data that may be reused, after the identification information that "local display is being performed" has been transmitted, the client device 202 may transmit identification information that "local display is ended" to the server 201. When the server 201 receives the operation information group 701 after receiving the identification information that "local display is being performed", the server 201 performs the processing of the Step S1302 but does not perform the processing of Step S1303 to the processing of Step S1309 until the server 201 receives the identification information that "local display is ended". By transmitting the identification information that "local display is being performed", the server 201 is enabled to determine that the image data is not to be transmitted, and thus, the server 201 may reduce a processing amount of update and transmission of image data while updating the frame buffer 902.

Next, the client device 202 generates moving image data from the extracted image data and displays the moving image data on the display screen 110 of the display 407 (Step S1602). After Step S1602 is ended, after Step S1506 is ended, or if NO in Step S1502, the client device 202 determines whether or not the ending point of the operation locus of the series of operations performed by the user is detected (Step S1603). As a procedure of detecting the ending point of the operation locus of the series of operations, the client device 202 determines, for example, if a notification that the finger or the like of the user has been removed from the touch panel 408 is detected while the in-operation flag is ON, that the ending point of the operation locus of the series of operations is detected. Also, when the client device 202 includes a mouse, the client device 202 determines, if a notification that the button of the mouse has been removed is detected while the in-operation flag is ON, that the ending point of the operation locus of the series of operations is detected. If the ending point of the operation locus of the series of operations performed by the user is detected (YES in Step S1603), the client device 202 sets the in-operation flag to be OFF (Step S1604).

After Step S1604 is ended, or if the ending point of the operation locus of the series of operations performed by the user is not detected (NO in Step S1603), the client device 202 ends image capturing processing performed by the client device. By executing the image capturing processing by the client device, image data corresponding to the operation performed by the user is enabled to be displayed regardless of the connection environment, and thus, the user operability may be increased.

Also, in the flowcharts of FIG. 13 and FIGS. 14A, 14B, and 14C, when image data stored in the operation information table 611 may be reused, the operation information group 701 is not transmitted. In this case, there is a probability that the server 201 may not properly obtain a difference region. For example, it is assumed that if, after the image data stored in the operation information table 611 is reused, new operation information group 701 is obtained and there is no image data that may be reused in the operation information table 611, the client device 202 transmits the operation information group 701 to the server 201. In this case, the display contents of the frame buffer 902 before update is performed does not match the display contents of the display screen 110, and therefore, there is a probability that the server 201 does not properly obtain the difference region.

In order to properly obtain the difference region, the client device 202 may transmit, if there is no image data that may be reused in the operation information table 611, the operation information group 701 which existed when the image data stored in the operation information table 611 was reused and the new operation information group 701. Accordingly, because of the operation information group 701, the display contents of the frame buffer 902 matches the display contents of the display screen 110, and thus, the server 201 may obtain a proper difference region corresponding to the new operation information group 701.

As has been described, according to this embodiment, the client device 202 extracts, if the operation locus L2 of the series of current operations overlaps with the operation locus L1 of the previous series of operations and has continuity with the operation locus L1, image data for the operation locus L2 from the image data displayed when the series of operations of the operation locus L1 were performed. Thus, the client device 202 is enabled to display the image data for the operation locus L2 reusing the image data displayed when the series of operations of the operation locus L1 were performed without communicating with the server 201, and therefore, the operability may be improved.

Also, using the client device 202, the pieces of image data corresponding to the coordinate positions of the points representing the operation locus of the series of operations may be sequentially displayed on the display screen 110 in the order of the series of operations. The client device 202 displays pieces of image data in the order in which the points representing the operation locus L2 are input, and thus, the pieces of image data may be displayed in the order of operations performed by the user.

Also, using the client device 202, the coordination position of a point included in each operation information of a continuous operation performed on the display screen 110 and image data received as a result of transmission of each operation information to the server 201 may be stored in the operation information table 611 such that the coordinate position and the image data are associated with each other. Thus, the client device 202 may prepare image data that may be reused.

Also, using the client device 202, the image data received as a result of transmission of each operation information of a series of operations to the server 201 may be sequentially displayed on the display screen 110 in the order of the series of operations in the following case. That is, in a case where the operation locus L2 of the series of operations does not overlap with the operation locus L1 of the previous series of operations or does not have continuity with the operation locus L1, the client device 202 performs the above-described display.

Thus, if there is no image data that may be reused, the client device 202 may obtain image data corresponding to an operation performed by the user by referring to the server 201 for the image data.

Also, using the client device 202, if the operation locus L2 of the series of operations overlaps with the operation locus L1 of the previous series of operations and has continuity with the operation locus L1, transmission of the operation information may be stopped. Thus, the thin client system 200 may omit the processing of transmitting the operation information, the processing of obtaining the difference region corresponding to the operation information, and the processing of transmitting the image data of the different region.

Also, using the client device 202, when a user operates an app using a smart terminal, such as a tablet terminal, in a mobile environment in which a communication state is unstable, even if communication is temporarily disconnected, local plotting is performed each time an operation of rotating an object and so forth is repeated. Thus, the thin client system 200 may conceal the instability of communication environment from the user. In particular, when an object is observed from various angles by rotating or inversely rotating the object, the thin client system 200 rarely causes reduction in operability in the smart terminal whose weakness is often found in unstable communication and the amount of data transmission, and provides a smooth operation to the user.

Note that the image capturing method described in this embodiment may be realized by causing a computer, such as a personal computer, a workstation, and so forth, to execute a previously prepared program. An image processing program according to this embodiment is stored in a computer readable recording medium, such as a hard disk, a flexible disk, a CD-ROM, a MO, a DVD, and so forth, and executed by causing a computer to read the program from the recording medium. Also, the image processing program may be distributed via a network, such as the Internet, and so forth.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A system comprising:
   a terminal device including:
      a first memory, and
      a first processor coupled to the first memory and configured to:
         receive a plurality of image data corresponding to images to be displayed on a display device in accordance with a first operation input to the terminal device,
         store the plurality of image data and first locus information indicating a first locus of the first operation into the first memory,
         accept a second operation,
         compare the first locus and a second locus of the second operation based on the first locus information stored in the first memory and second locus information indicating the second locus, generate moving image data to be played back in accordance with a result of the comparison between the first locus and the second locus, the moving image data including at least a portion of the plurality of image data stored in the first memory and corresponding to respective points of the first locus, and display the moving image data on the display device; and an information processing device including:
  a second memory, and
  a second processor coupled to the second memory and configured to transmit the plurality of image data to the terminal device.

2. The system according to claim 1,
wherein each of the first operation and the second operation is an operation performed when a selection instruction regarding a display operation of the display device is continuously executed.

3. The system according to claim 1,
wherein the first processor is further configured to:
  obtain the first locus information including a position of each point representing the first locus corresponding to the first operation performed on a screen,
  transmit the first locus information to the information processing device, and
  receive the plurality of the image data corresponding to the position of each point representing the first locus from the information processing device, and
  wherein the position of each point in the first locus information is stored into the first memory and associated with a corresponding one of the plurality of image data.

4. The system according to claim 1,
when a part or the whole of the first locus overlaps with the second locus, wherein the first processor generates the moving image data which includes the at least the portion of the plurality of image data corresponding to the second operation locus.

5. The system according to claim 4,
wherein the moving image data including the at least the portion of the plurality of image data is sequentially displayed in accordance with the second operation locus.

6. The system according to claim 4,
wherein the first processor is further configured to:
  transmit, when the part or the whole of the second locus does not overlap with the first locus, a request for other image data regarding the second operation to the information processing device, and
  display other moving image data including the other image data received from the information processing device, on the display device.

7. The system according to claim 6,
wherein the first processor is further configured to stop, when the part or the whole of the second locus overlaps with the first locus, transmission of the request for the other image data to the information processing device.

8. A terminal device comprising:
a memory; and
a processor coupled to the memory and configured to:
  receive a plurality of first image data corresponding to images to be displayed on a display device in accordance with a first operation input to the terminal device,
  store the plurality of image data and first locus information indicating a first locus of the first operation into the memory,
  accept a second operation,
  compare the first locus and a second locus of the second operation based on the first locus information stored in the memory and second locus information indicating the second locus,
  generate moving image data to be played back in accordance with a result of the comparison between the first locus and the second locus, the moving image data including at least a portion of the plurality of image data stored in the memory, and corresponding to respective points of the first locus, and
  display the moving image data.

9. The terminal device according to claim 8,
wherein each of the first operation and the second operation is an operation performed when a selection instruction regarding a display operation of the display device is continuously executed.

10. The terminal device according to claim 8,
wherein the processor is further configured to:
  obtain the first locus information including a position of each point representing the first locus corresponding to the first operation performed on a screen,
  transmit the first locus information to an information processing device, and
  receive the plurality of the image data corresponding to the position of each point representing the first locus from the information processing device, and
  wherein the position of each point in the first locus information is stored in the memory and associated with a corresponding one of the plurality of image data.

11. The terminal device according to claim 8,
when a part or the whole of the first locus overlaps with the second locus, wherein the processor generates the moving image data which includes the at least the portion of the plurality of image data corresponding to the second operation locus.

12. The terminal device according to claim 11,
wherein the moving image data including the at least the portion of the plurality of image data is sequentially displayed in accordance with the second operation locus.

13. The terminal device according to claim 11,
wherein the processor is further configured to:
  transmit, when the part or the whole of the second operation locus does not overlap with the first locus, a request for other image data regarding the second operation to an information processing device, and
  display other moving image data including the other image data received from the information processing device, on the display device.

14. The terminal device according to claim 13,
wherein the processor is further configured to stop, when the part or the whole of the second locus overlaps with the first locus, transmission of the request for the other image data to the information processing device.

15. An image capturing method executed by a computer, comprising:
  receiving, from an information processing device a plurality of image data corresponding to images to be displayed on a display device in accordance with a first operation input to the computer;

storing the plurality of image data and first locus information indicating a first locus of the first operation into the memory;

accepting a second operation;

comparing the first locus and a second locus of the second operation based on the first locus information stored in the memory and second locus information indicating the second locus, generating moving image data to be played back in accordance with a result of the comparison between the first locus and the second locus, the moving image data including at least a portion of the plurality of image data stored in the memory, and corresponding to respective points of the first locus; and displaying the moving image data.

16. The image capturing method according to claim 15, wherein each of the first operation and the second operation is an operation performed when a selection instruction regarding a display operation of the display device is continuously executed.

17. The image capturing method according to claim 15, further comprising:

obtaining the first locus information including a position of each point representing the first locus corresponding to the first operation performed on a screen;

transmitting the first locus information to the information processing device; and receiving the plurality of the first image data corresponding to the position of each point representing the first locus from the information processing device, and wherein the storing stores the position of each point in the first locus information, associated with a corresponding one of the plurality of the image data.

18. The image capturing method according to claim 15, when a part or the whole of the first locus overlaps with the second locus, wherein the generating generates the moving image data which includes the at least the portion of the plurality of image data corresponding to the second operation locus.

19. The image capturing method according to claim 18, wherein the moving image data including the at least the portion of the plurality of image data is sequentially displayed in accordance with the second operation locus.

20. The image capturing method according to claim 18, further comprising:

transmitting, when the part or the whole of the second locus does not overlap with the first locus, a request for other image data regarding the second operation to the information processing device, and displaying other moving image data including the other image data received from the information processing device, on the display device.

* * * * *